US012701004B1

(12) United States Patent
Sadanand

(10) Patent No.: US 12,701,004 B1
(45) Date of Patent: Aug. 4, 2026

(54) HYBRID PROTOCOL GATEWAY FOR UNIFIED MANAGEMENT OF MIXED FLEETS

(71) Applicant: Samsara Inc., San Francisco, CA (US)

(72) Inventor: Shobin Sadanand, Thornton, CO (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/430,981

(22) Filed: Dec. 23, 2025

(51) Int. Cl.
| | |
|---|---|
| *H04L 67/10* | (2022.01) |
| *H04L 1/06* | (2006.01) |
| *H04L 9/32* | (2006.01) |

(52) U.S. Cl.
CPC .............. *H04L 9/32* (2013.01); *H04L 1/0612* (2013.01)

(58) Field of Classification Search
CPC ................................ H04L 9/32; H04L 1/0612
See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,917,433 | A | 6/1999 | Keillor et al. |
| 6,064,299 | A | 5/2000 | Lesesky et al. |
| 6,098,048 | A | 8/2000 | Dashefsky et al. |
| 6,157,864 | A | 12/2000 | Schwenke et al. |
| 6,253,129 | B1 | 6/2001 | Jenkins et al. |
| 6,317,668 | B1 | 11/2001 | Thibault et al. |
| 6,411,203 | B1 | 6/2002 | Lesesky et al. |
| 6,421,590 | B2 | 7/2002 | Thibault |

| | | | |
|---|---|---|---|
| 6,452,487 | B1 | 9/2002 | Krupinski |
| 6,505,106 | B1 | 1/2003 | Lawrence et al. |
| 6,651,063 | B1 | 11/2003 | Vorobiev |
| 6,714,894 | B1 | 3/2004 | Tobey et al. |
| 6,718,239 | B2 | 4/2004 | Rayner |
| 6,741,165 | B1 | 5/2004 | Langfahl et al. |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

Great Britain Office Action for GB Application No. 2522618.4, dated Feb. 27, 2026, in 6 pages.

(Continued)

*Primary Examiner* — Hany S. Gadalla
(74) *Attorney, Agent, or Firm* — Knobbe, Martens, Olson & Bear, LLP

(57) ABSTRACT

An IoT management system may be configured to provide unified remote SIM provisioning across mixed Internet-of-Things (IoT) device fleets while simultaneously ensuring resilient profile delivery over satellite links. A hybrid protocol gateway interfaces with both modern SGP.32 (Secure Global Platform 3.2) and legacy SGP.02 (Secure Global Platform 2.0) devices, translating management commands and performing on-the-fly profile format transcoding to accommodate heterogeneous endpoints. A delay-tolerant networking (DTN) gateway may be configured to ensure reliable profile delivery over intermittent satellite connections by fragmenting profile payloads into bundles, scheduling transmissions based on satellite visibility windows, and supporting multi-pass delivery for enhanced reliability.

15 Claims, 9 Drawing Sheets

(56) References Cited

U.S. PATENT DOCUMENTS

| | | | |
|---|---|---|---|
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,887,741 B1 | 1/2021 | Indurkar |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |

(56) References Cited

U.S. PATENT DOCUMENTS

| | | |
|---|---|---|
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 12,344,168 B1 | 7/2025 | Wang et al. |
| 12,346,712 B1 | 7/2025 | Eberhardt et al. |
| 12,367,718 B1 | 7/2025 | Calmer et al. |
| 12,368,903 B1 | 7/2025 | Lin et al. |
| 12,426,007 B1 | 9/2025 | Aguilar et al. |
| 12,445,285 B1 | 10/2025 | McHugh et al. |
| 12,450,329 B1 | 10/2025 | Torres et al. |
| 12,479,446 B1 | 11/2025 | Jurden et al. |
| 12,501,178 B1 | 12/2025 | Shemet et al. |
| 12,511,947 B1 | 12/2025 | Symons et al. |
| 12,524,314 B1 | 1/2026 | Rajadurai et al. |
| 12,534,097 B1 | 1/2026 | Rajvanshi et al. |
| 12,561,624 B1 | 2/2026 | Wang et al. |
| 12,565,143 B1 | 3/2026 | Dhamija et al. |
| 12,621,184 B1 | 5/2026 | Stevenson et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |

(56) References Cited

U.S. PATENT DOCUMENTS

| | | |
|---|---|---|
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2015/0349826 A1* | 12/2015 | Li ..................... H04W 4/60 |
| | | 455/558 |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0302070 A1 | 10/2016 | Yang et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0139847 A1 | 5/2020 | Baumer et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342506 A1 | 10/2020 | Levy et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0097315 A1 | 4/2021 | Carruthers et al. |
| 2021/0397908 A1 | 12/2021 | ElHattab et al. |
| 2022/0165073 A1 | 5/2022 | Shikii et al. |
| 2022/0289203 A1 | 9/2022 | Makilya et al. |
| 2022/0374737 A1 | 11/2022 | Dhara et al. |
| 2023/0077207 A1 | 3/2023 | Hassan et al. |
| 2023/0153735 A1 | 5/2023 | Dhara et al. |
| 2023/0169420 A1 | 6/2023 | Dhara et al. |
| 2023/0281553 A1 | 9/2023 | Singh et al. |
| 2023/0328506 A1* | 10/2023 | Balasubramanian ...................... |
| | | H04W 8/005 |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |
| 2025/0002033 A1 | 1/2025 | Calmer et al. |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |
| WO | WO 2025/075252 A1 | 4/2025 |

OTHER PUBLICATIONS

"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).

(56)                    References Cited

OTHER PUBLICATIONS

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAlalQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Driver I, The Power of Vision, Netradyne, [publication date unknown], in 2 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.

"EcoDrive", Wikipedia, 2022, in 1 page. URL: https://en.wikipedia.org/wiki/EcoDrive.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.

"Fiat launches EcoDrive for 500 and Grande Punto", Indian Autos Blog, Jul. 10, 2008, in 4 p. URL: https://indianautosblog.com/fiat-launches-ecodrive-for-500-and-grande-punto-p3049.

"Fiat launches fleet-specific eco:Drive system", Fleet World, 2010, in 3 pages. URL: https://fleetworld.co.uk/fiat-launches-fleet-specific-ecodrive-system/.

"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.

Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Fuelopps" [archived webpage], Propel It, archived on Nov. 14, 2017, in 3 pages. URL: https://web.archive.org/web/20171114184116/http://www.propelit.net:80/fuelopps2.

"Fuelopps", Propel It, [publication date unknown], in 1 page. (PROPEL-IT-1393_00001).

"FuelOpps™ Delivers for Covenant Transportation Group—Improved driver behavior contributes to a 3+% MPG improvement in less than 12 months", FuelOpps by Propel IT, [publication date unknown], in 2 pages.

"FuelOpps™ Version 2.0" [presentation], Propel IT, Inc., [publication date unknown], in 17 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 22 pages.

"Introduction Pack", Drivecam, Inc., 2012, in 32 pages. URL: https://www.iae-services.com.au/downloads/DriveCam-Introduction-Pack.pdf.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video- telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages, URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Motive Announces AI Omnicam, the Industry's First AI-Enabled Camera Built for Side, Rear, Passenger, and Cargo Monitoring",

(56)            References Cited

OTHER PUBLICATIONS

Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&1%5B1%5D=Telematics&t%5B2%5D=Connectivity&curl=1.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"The 2012 Fiat 500: eco:Drive", Fiat500USA.com, Feb. 14, 2011, in 24 pages. URL: http://www.fiat500usa.com/2011/02/2012-fiat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

"Transform your business with the Connected Operations™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle

(56)　　　　　　References Cited

OTHER PUBLICATIONS

Telematics, Fleet Management, and Video-Based Safety Systems, Devices, and Components thereof, Investigation No. 337-TA-1393), in 1 page.

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.

Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMlrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages, URL: https://transcanadahvedr.ca/wp-content/uploads/2022/01/T8080_Deliverable4-DevSmryRpt-FINAL- 20180804_English.pdf.

AutoMoto TV, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix@ Wingman@ Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf [uploaded in 2 parts].

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f5866 99489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", Mckinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, "Ciao!"—Fiat ecoDrive [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin- higher-on-freighttech-25-list.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Blir90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

(56)  References Cited

OTHER PUBLICATIONS

Groover, M. P., Automation, Production Systems, and Computer-Integrated Manufacturing, 2015, 4th Edition, Pearson, in 811 pages.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FreightWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Haworth, N. et al., "The Relationship between Fuel Economy and Safety Outcomes", Monash University, Accident Research Centre, Dec. 2001, Report No. 188, in 67 pages.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS One, Apr. 2017, vol. 12(4): e0174959, in 16 pages.
Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-al-driver-safety.
Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893—New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages, URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages, URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication

(56)  References Cited

OTHER PUBLICATIONS date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

(56) References Cited

OTHER PUBLICATIONS

Motive Help Center, "What are Vehicle Gateway Malfunctions and Data Diagnostics", Motive Technologies, Inc., accessed on Oct. 24, 2023 [publication date unknown], in 4 pages, URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-US/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en- us/articles/6161577899165-What-is-Fuel-Hub-.

Motive Help Center, "What is Motive Fleet App?", Motive Technologies, Inc., accessed on Oct. 24, 2023 [publication date unknown], in 12 pages, URL: https://helpcenter.gomotive.com/hc/en- us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en- us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer- tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 2 pages. URL: https://www.youtube.com/watch?v=WnclRs_cFw0.

Motive, "How to install your Motive AI Dashcam." [video], YouTube, Aug. 5, 2022, screenshot in 2 pages. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Motive, "KeepTruckin ELD Training for Drivers" [video], YouTube, Feb. 2, 2018, screenshot in 1 page. URL: https://www.youtube.com/watch?v=LKJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

(56)           References Cited

OTHER PUBLICATIONS

Motive, "Motive Fleet View | Advanced GPS system for live and historical fleet tracking." [video], YouTube, Jan. 23, 2023, screenshot in 1 page. URL: https://www.youtube.com/watch?v=CSDIDZhiVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for- cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages, URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_ 1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j61.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 2 pages. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

Motive, "The Motive Driver App: Digitally record hours of service (HOS)." [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.

Motive, "The Motive Driver App: View hours of service (HOS) violations." [video], YouTube, Aug. 10, 2022, screenshot in 2 pages. URL: https://www.youtube.com/watch?v=qJX2ZiBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

Motive, "What is an AI dashcam?", Motive Technologies, Inc., Jan. 21, 2022, in 6 pages. URL: https://gomotive.com/blog/what-is-ai-dashcam/.

Motive, "WiFi Hotspot sets you free from restrictive cell phone data plans.", Motive Technologies, Inc., Jun. 27, 2019, in 5 pages. URL: https://gomotive.com/blog/wifi-hotspot/.

Motive, "WiFi Hotspot", Motive Technologies, Inc., accessed on Feb. 18, 2024 [publication date unknown], in 5 pages. URL: https://gomotive.com/products/wifi-hotspot/.

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www.youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news- releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www.youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=l8sX3X02aJo.

(56) References Cited

OTHER PUBLICATIONS

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.

Netradyne, Driver Card 1, 2018, in 2 pages (ND_ITC_0001-ND_ITC_0002).

Netradyne, Driver Card 2, 2018, in 2 pages (ND_ITC_0003-ND_ITC_0004).

Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), *Web-Based Control and Robotics Education*, 2009, Springer, ISBN 978-90-481-2504-3, in 362 pages. [uploaded in 3 parts].

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.

Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.

Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.

Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.

Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.

Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.

Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.

Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Soumik Ukil, "LightMetrics ADAS demo" [video], YouTube, Jul. 20, 2017, screenshot in 1 page. URL: https://www.youtube.com/watch?app=desktop&v=9LGz1oo7dTw.

Steger, C. et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., *Machine Vision Algorithms and Applications*, 2018, 2nd ed., Wiley, in 60 pages.

(56)         References Cited

OTHER PUBLICATIONS

Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in p. 7. URL: https://supposeudrive.com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete.com/.

The Wayback Machine, "Introducing Driver-|™", NetraDyne, Sep. 22, 2016, in 4 pages URL: https://web.archive.org/web/20160922034006/http://www.netradyne.com/solutions.html.

The Wayback Machine, "NetraDyne's Driveri™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.

Top Fives, "15 Biggest Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page. URL: https://www.youtube.com/watch?v=M5r5wZozS0E.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

"Post Quantum Cryptography—Guidelines for Telecom Use Cases", GSM Association, Oct. 4, 2024, Version 2.0, in 146 pages.

European Office Action for EP Application No. 25226893.3, dated May 29, 2026, in 9 pages.

* cited by examiner

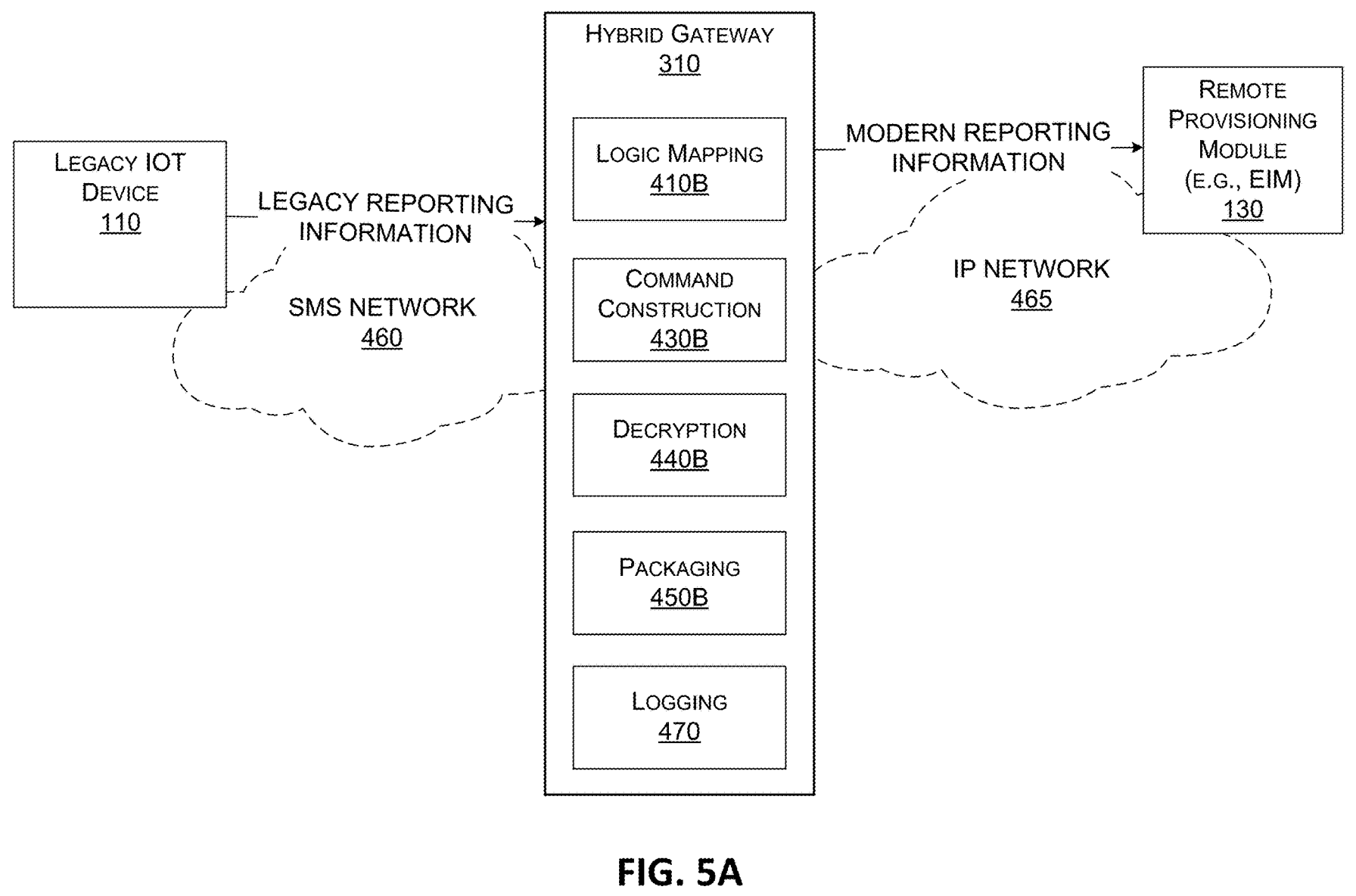

REMOTE PROVISIONING MODULE (E.G., EIM) 130

IP NETWORK 465

MODERN REPORTING INFORMATION

HYBRID GATEWAY 310

LOGIC MAPPING 410B

COMMAND CONSTRUCTION 430B

DECRYPTION 440B

PACKAGING 450B

LOGGING 470

LEGACY REPORTING INFORMATION

SMS NETWORK 460

LEGACY IOT DEVICE 110

FIG. 5A

RECEIVE DEVICE RESPONSE
501

DECRYPT RESPONSE
502

MAP STATUS TO MODERN RESULT
503

UPDATE INTERNAL STATE
504

REPORT COMPLETION
505

HYBRID PROTOCOL GATEWAY FOR UNIFIED MANAGEMENT OF MIXED FLEETS

BACKGROUND

Enterprises deploying IoT (Internet-of-Things) devices often provision connectivity using traditional SIM (subscriber identity module) cards and SMS-based (Short Messaging Service-based) workflows tied to specific operators, and then lack flexible IP-based profile management or robust support for high-latency or intermittent satellite connectivity.

SUMMARY

The GSMA SGP.02 Machine-to-Machine architecture enforces a server-centric "push" model wherein a profile routing module maintains a secure channel to an embedded Universal Integrated Circuit Card (eUICC) and pushes application protocol data units (APDUs) to install, enable, disable, or delete profiles. The GSMA SGP.32 IoT architecture introduces a device-centric "indirect pull" model in which a remote provisioning module orchestrates operations by sending IP triggers to a local assistant module on the device, which then independently connects to a profile preparation module to fetch a Bound Profile Package (BPP) over a secure IP download interface. These divergent architectures create operational silos for enterprises maintaining large legacy SGP.02 fleets while adopting SGP.32 for new deployments. Additionally, standard IP transport assumptions do not hold in non-terrestrial networks; intermittent and high-latency satellite links cause chronic timeouts and failures in conventional, synchronous provisioning workflows.

The technology described herein provides systems and methods for unified remote SIM provisioning and management across mixed fleets of legacy SGP.02 and modern SGP.32 devices, and for resilient profile delivery over intermittent satellite links. A hybrid gateway interfaces northbound with a remote provisioning module using device-centric IP control semantics while emulating secure-routing semantics southbound for legacy devices. The gateway may perform protocol translation between device-centric operations and legacy APDU sequences, normalizes legacy reporting, and maintains an internal eUICC information set to ensure audit continuity. In some embodiments, the hybrid gateway generates and manages virtual identifiers for legacy devices to present a uniform fleet address space to modern control systems. In trusted proxy embodiments, the gateway may perform on-the-fly profile format transcoding by ingesting a BPP from a profile preparation module, parsing profile elements, repackaging them into legacy installable structures, and re-encrypting the transformed payload for delivery under secure channel protocols.

In various implementations, use of a hybrid gateway, as discussed herein, may provide one or more technical advantages including:

Asset Protection: extends the operational life of millions of 2G/3G/4G M2M devices that cannot be upgraded to SGP.32 firmware, protecting billions of dollars in hardware investment.

Unified Operations: Enterprises can consolidate their operations onto a single modern dashboard (the eIM) for both legacy and new devices, significantly reducing Operational Expenditure (OpEx) related to maintaining dual systems.

Seamless Migration: Enables a phased migration strategy. Companies can deploy SGP.32 devices for new rollouts while managing existing fleets via the Gateway, avoiding the prohibitive cost of a "rip and replace" strategy.

The technology further includes a store-and-forward delay-tolerant networking gateway configured for resilient satellite-based provisioning. The DTN gateway accepts custody of profile payloads, fragments large packages into bundles suitable for intermittent links, and resumes transmission across multiple passes using contact-plan-aware scheduling. Security may be preserved by encapsulating end-to-end TLS records within bundles or by terminating TLS at a trusted proxy and applying bundle security on the space leg. A telemetry-based orchestration engine may ingest device telemetry, such as battery and signal quality, to compute suitability scores and defer operations until conditions are favorable, thereby improving success rates and conserving device resources.

The examples and embodiments described herein are provided for illustrative purposes only and are not intended to limit the scope of the described subject matter. Certain well-known elements, processes, or protocols may be omitted for clarity, as they are readily understood by those skilled in the art. Furthermore, various modifications, rearrangements, or alternative implementations of the described systems and methods may be made without departing from the spirit and scope of the subject matter, as defined by the claims.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 5A is a block diagram illustrating example internal components of the hybrid gateway configured to receive, interpret, and relay legacy reporting information from a legacy IoT device to a remote provisioning module over an IP network.

3 information from a legacy device and emit a device-centric result to a remote provisioning module.

Figure 6:
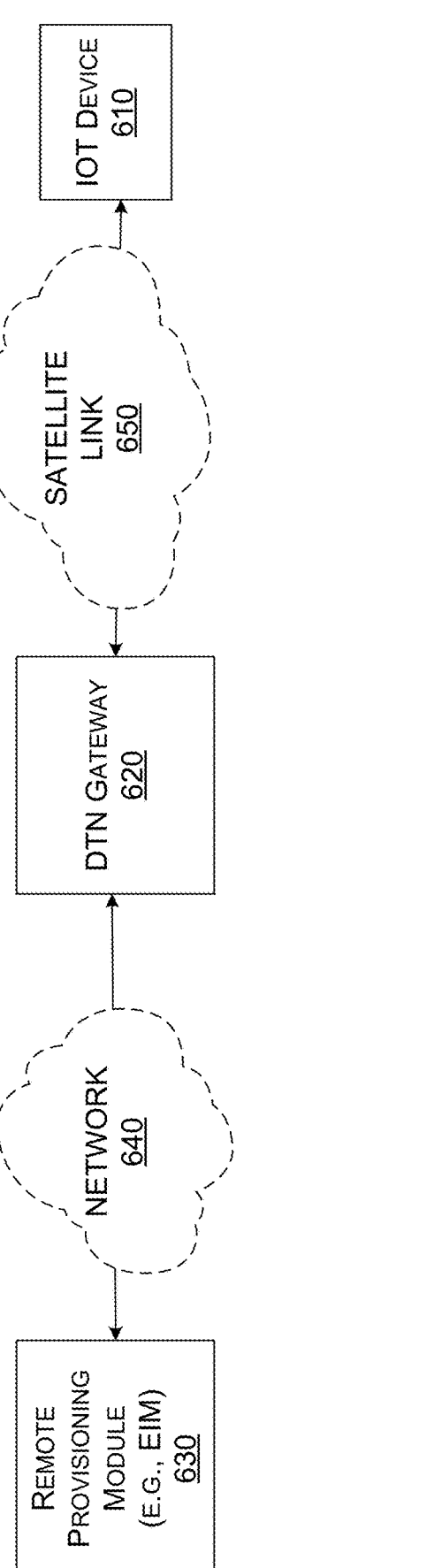

FIG. 6 is a block diagram illustrating an example environment implementing a store-and-forward delivery architecture for resilient eSIM profile provisioning over intermittent satellite links.

Figure 7:
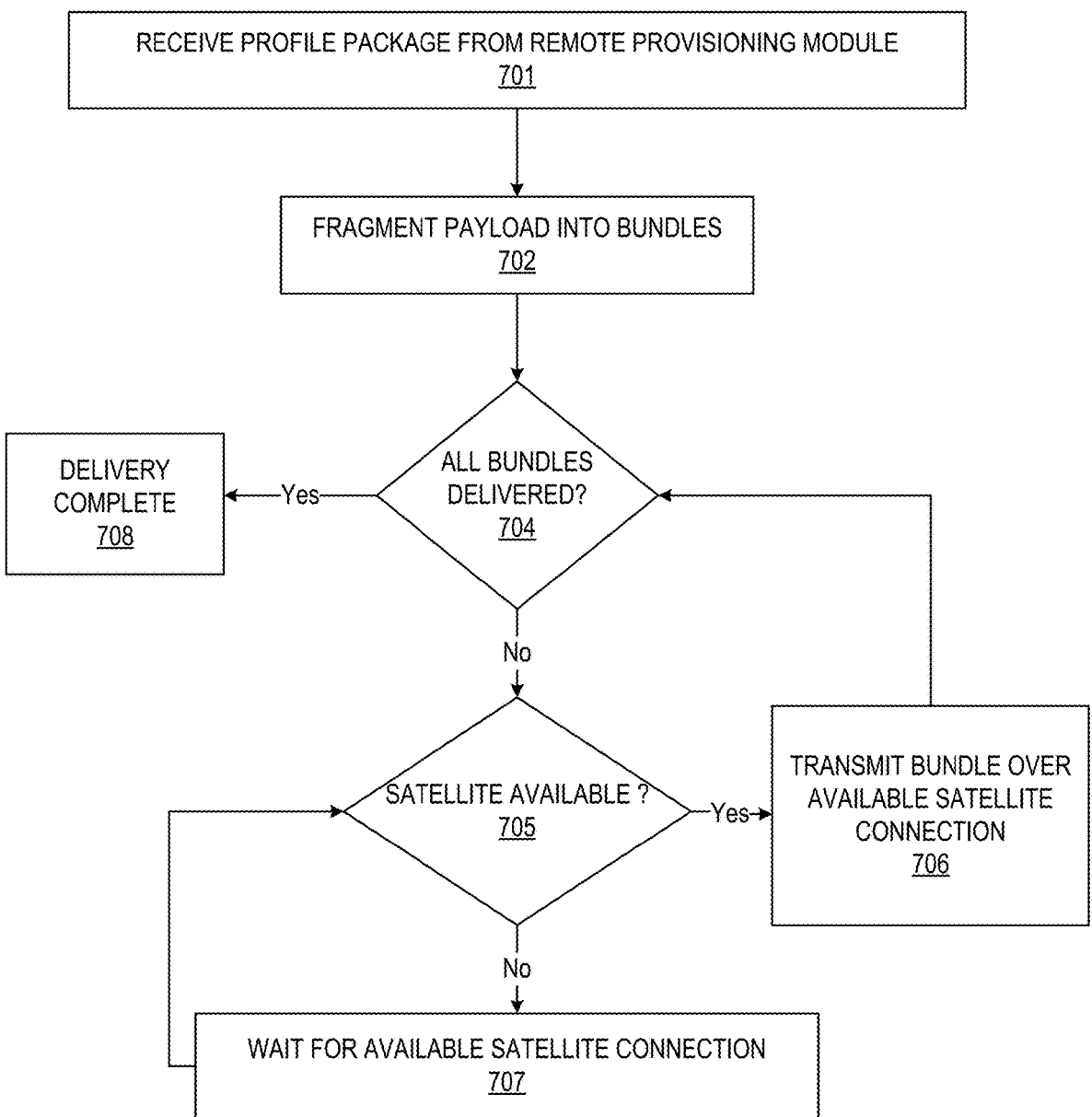

FIG. 7 is a flowchart illustrating an example method of store-and-forward delivery of eSIM profile packages over intermittent satellite links.

Figure 8:
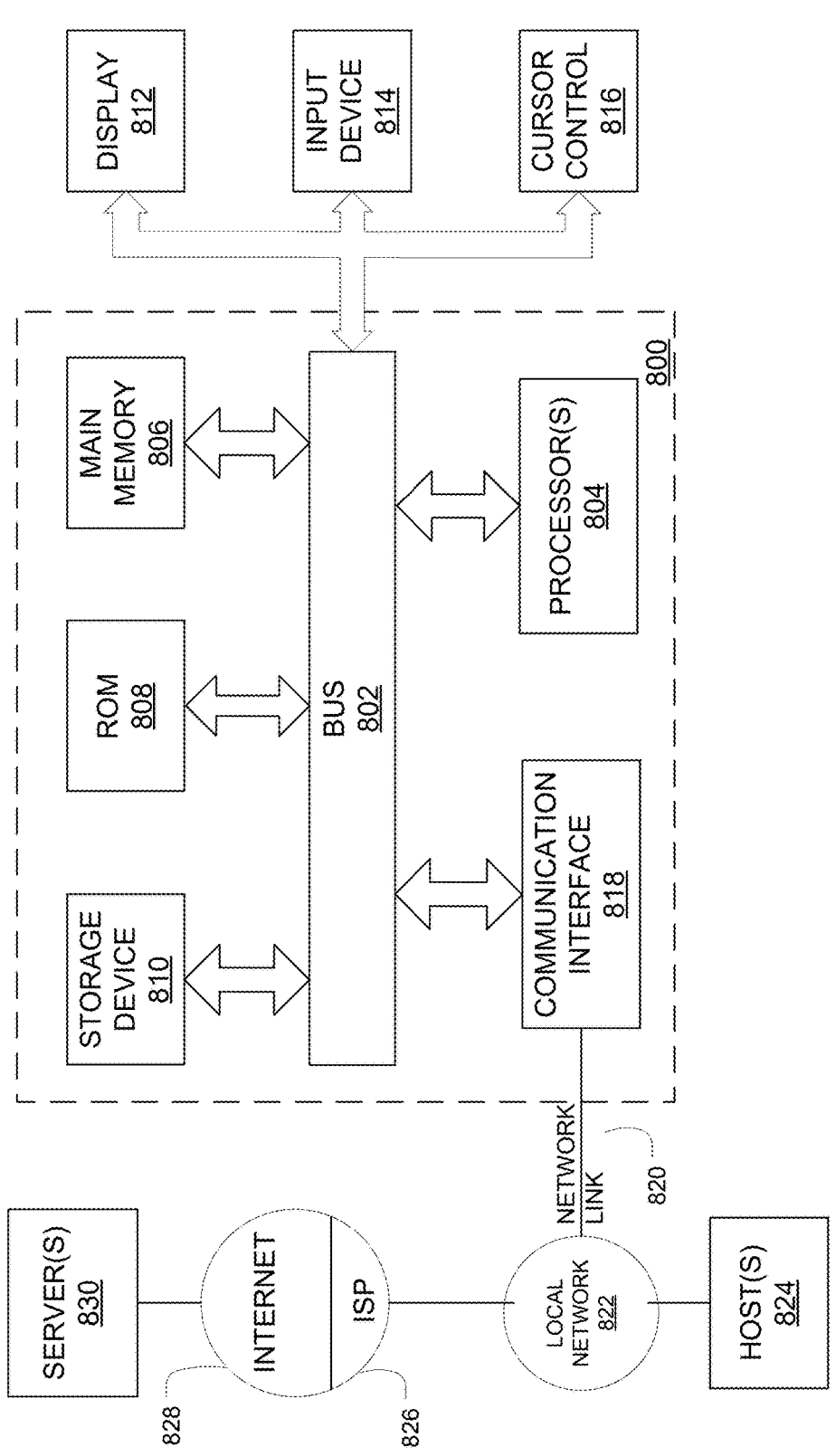

FIG. 8 is a block diagram that illustrates an example computer system upon which various embodiments of the systems and/or processes illustrated in the figures and/or discussed herein may be implemented.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Remote provisioning generally describes a process by which a device receives an updated SIM identity. In general, a Subscription Manager (often operated by a telecom carrier or a specialized security vendor) pushes a digital eSIM (embedded subscriber identity module) profile over the air to a dedicated, tamper-proof chip (eUICC) inside the device, allowing the network subscription—e.g., a wireless data plan for a specific carrier—to be installed, switched, or deleted without physically swapping a card. In practice, a profile preparation module (e.g., an SM-DP) securely generates, encrypts, and packages a carrier's sensitive network credentials (such as the IMSI and authentication keys) into a downloadable format. A profile routing module (e.g., an SM-SR) is configured to maintain a permanent, privileged digital connection with the device's chip, acting as the gateway to route the encrypted profile to the device and issuing commands to enable, disable, or delete it. Thus, to provide an updated eSIM to a device, the profile preparation module generates an encrypted profile package and coordinates with the profile routing module to send the data to the eUICC of the device and trigger activation of a new or updated subscription.

A legacy IoT device (or "legacy device") generally describes a device that is configured to receive SIM updates using a server-centric "push" model. For example, when an update to the eSIM of a legacy device is required, the profile routing module may first wake the device, establish a secure session, and then push the encrypted profile package (e.g., received from the profile preparation module) directly into the chip. Because a legacy IoT device lacks the intelligence to fetch profiles itself, it is heavily dependent on the specific integration between the carrier and the profile routing module, making it technically difficult to switch service providers. Examples of legacy devices include units compliant with SGP.02 as well as devices using proprietary or operator-specific secure-routing mechanisms exhibiting similar limitations, such as older M2M smart meters that rely on SMS-PP triggers and SCP80-protected APDUs, automotive telematics modules integrating an SM-SR-equivalent routing function over TCP/SCP81, and industrial gateways that accept profile updates via vendor-specific binary transports without a device-centric IP pull capability.

A modern IoT device (or "modern device") generally describes a device that is configured to receive SIM updates under a device-centric "indirect pull" model, including devices compliant with SGP.32 as well as devices using equivalent IP-based provisioning mechanisms that provide similar capabilities. In such deployments, when an update to the eSIM is required, a remote provisioning manager (e.g., an eIM) may send a trigger over an IP control interface instructing a local assistant module on the device (e.g., an IoT Profile Assistant) to independently establish a secure session with a profile preparation module (e.g., an SM-DP+) and pull a Bound Profile Package for installation into the eUICC. Because a modern IoT device possesses the intelligence to fetch and install profiles itself, it eliminates dependence on a routing tunnel with a profile routing module and facilitates flexible switching between service providers. Examples of modern devices include SGP.32-compliant asset trackers that use ESipa triggers over HTTP/CoAP/MQTT and pull profiles over ES9+, gateways that implement an IPA-equivalent agent for IP-based provisioning without SMS reliance, and embedded modules that support IP-centric profile management on constrained networks.

In some implementations, a modern IoT device may include a local assistant module (e.g., an IoT Profile Assistant), which is a specialized software agent embedded within the operating system of the device. The local assistant module provides a functional bridge between the device's secure chip (e.g., the eUICC) and external device, such as a profile preparation module or remote provisioning module. For example, the local assistant module of a modern IoT device may listen for trigger commands from a remote provisioning module, establish a secure connection to a profile preparation module (e.g., SM-DP+), and/or download an encrypted profile package for storage in the device's secure chip.

Hybrid Protocol Gateway

The Hybrid Protocol Gateway is designed to address the interoperability gap between legacy SGP.02-based IoT devices and modern SGP.32 management infrastructures. In conventional deployments, enterprises are required to maintain separate management systems for devices operating under different eSIM standards, leading to increased operational complexity, vendor lock-in, and limited scalability. The Hybrid Protocol Gateway functions as a middleware solution that enables seamless communication and unified management across these differing standards. By translating commands bidirectionally between SGP.02 and SGP.32 protocols, the gateway allows legacy devices to be managed by contemporary SGP.32 eIM servers without necessitating firmware updates or dual management platforms. Additionally, the gateway performs on-the-fly profile format conversion and maintains audit trail continuity, supporting secure and consistent device lifecycle management. This innovative architecture enables enterprises to consolidate their IoT operations, preserve existing investments in legacy devices, and facilitate a smooth transition to next-generation connectivity frameworks.

In SGP.02 legacy workflows, "ES5" refers to the server-centric application protocol layer employed by a profile routing module (e.g., an SM-SR) to manage profile lifecycle operations on an eUICC. ES5 operations may be realized on the card as ISO/IEC 7816 APDU command sequences delivered under secure messaging (e.g., SCP80 over SMS-PP or SCP81 over TCP/IP) and may include, by way of example, profile download, enable, disable, delete, and profile-information queries.

Figures 1, 2:
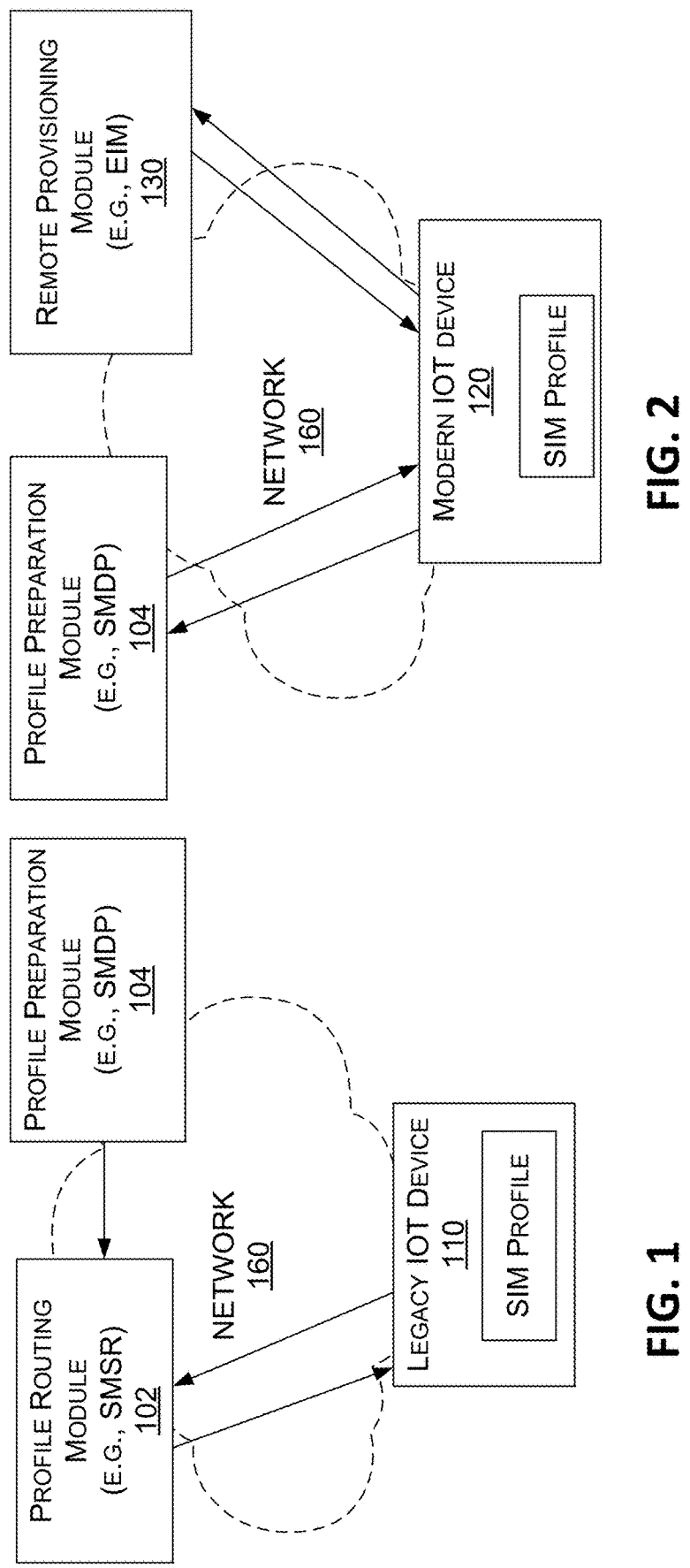
FIG. 1 is a block diagram illustrating an example communication environment in which a legacy IoT device is in communication with a profile routing module and a profile preparation module via a network.
FIG. 2 is a block diagram illustrating an example communication environment in which a modern IoT device is in communication with a profile preparation module and a remote provisioning module via a network.

FIG. 1 is a block diagram illustrating a communication environment in which a legacy IoT device 110 is in communication with a profile routing module 102 and a profile preparation module 104 via a network 160. In this embodiment, remote provisioning of the legacy device 110 is performed in accordance with the server-centric SGP.02 model. In this example, the profile preparation module 104 (e.g., a Subscription Manager-Data Preparation or SM-DP) generates, encrypts, and packages a carrier's network credentials (e.g., IMSI and authentication keys) into a downloadable profile package. The profile routing module 102 (e.g., a Subscription Manager-Secure Routing or SM-SR), maintains a communication channel with the secure chip (e.g., a eUICC) of the legacy IoT device 110 and establishes a secure channel (e.g., SCP80 over SMS-PP or SCP81 over TCP) to deliver application protocol data units (APDUs) to the chip. The APDUs may be configured to cause the legacy device 110 to perform actions, such as selecting security domains, installing/loading profile files, personalizing parameters (IMSI, keys), or enabling, disabling or deleting profiles.

In the example of FIG. 1, to initiate an update the profile routing module 102 wakes the legacy IoT device 110 through the network 160 using a machine trigger, such as a mobile-terminated binary SMS (MT-SMS, also referred to as SMS-PP) or mobile-originated SMS (SMS-MO). Upon establishing a secure session, the profile routing module 102 pushes the encrypted profile package that was received from the profile preparation module 104 into the eUICC by transmitting a sequenced set of APDUs that perform profile installation and personalization, followed by set-status operations to enable or disable profiles as required. The legacy IoT device 110 executes these commands under the secure channel and returns proof-of-receipt and status via the network 160, allowing the profile routing module 102 to update an authoritative device record and confirm completion of the transaction. Because the legacy IoT device 110 lacks the capability to independently fetch profiles, it relies on the integration between the profile preparation module 104 and the profile routing module 102 to receive and manage SIM profile updates.

FIG. 2 is a block diagram illustrating a communication environment in which a modern IoT device 120 is in communication with a profile preparation module 104 and a remote provisioning module 130 via a network 160. In this embodiment, remote provisioning of the modern device 120 is performed in accordance with the device-centric SGP.32 model. In this example, the remote provisioning module 130 (e.g., an eSIM IoT Remote Manager (eIM) coordinates profile state management operations by sending trigger messages over an IP interface (e.g., ESipa over HTTP, CoAP, or MQTT) to the modern IoT device 120. For example, the remote provisioning module 130 may issue an ESipa. TriggerProfileDownload command over HTTP/TLS to the modern IoT device 120, and the IoT device 120 may return ESipa result messages indicating progress checkpoints (e.g., "download started," "installation complete") with correlation and transaction identifiers that allow upstream systems to track the operation across retries.

An IP control interface is generally a software-defined API that may be implemented by the remote provisioning module 130 and by the device's IPA, operating over standard IP transports secured by, e.g., TLS/DTLS. In this example, the modern IoT device 120 includes a local assistant module, such as an IoT Profile Assistant (IPA), that listens for these triggers and, upon instruction, independently establishes a secure session with the profile preparation module 104.

Although ESipa is commonly carried over HTTP, CoAP, or MQTT, in some embodiments the IP control interface additionally supports bindings over Lightweight M2M (LwM2M) for highly constrained networks. The IP control interface may require correlation and transaction identifiers on all requests and responses, and specify deterministic retry behavior and standardized error code taxonomies to ensure consistent orchestration across diverse transports and failure modes.

The profile preparation module 104 (e.g., a SM-DP+) generates a Bound Profile Package (BPP) including the carrier's network credentials and personalization data for the target eUICC, and makes the package available over a secure download interface (e.g., ES9+ over TLS/DTLS). Upon receiving the trigger from the remote provisioning module 130, the IPA on the modern IoT device 120 authenticates to the profile preparation module 104 and pulls the BPP directly across the network 160. The device then installs the profile into the eUICC and performs any personalization steps required by the package. Throughout the operation, the modern device 120 may report progress and completion status back to the remote provisioning module 130 over the same software-defined IP control interface, enabling unified fleet management without inserting the remote provisioning module 130 into the profile data path.

Throughout the operation, the modern IoT device 120 may report progress and completion status back to the remote provisioning module 130 over the IP control interface. Because the modern IoT device 120 possesses the intelligence to fetch and install profiles from the profile preparation module 104, it eliminates the dependence on a routing tunnel with a profile routing module and facilitates flexible switching between service providers.

Figure 3:
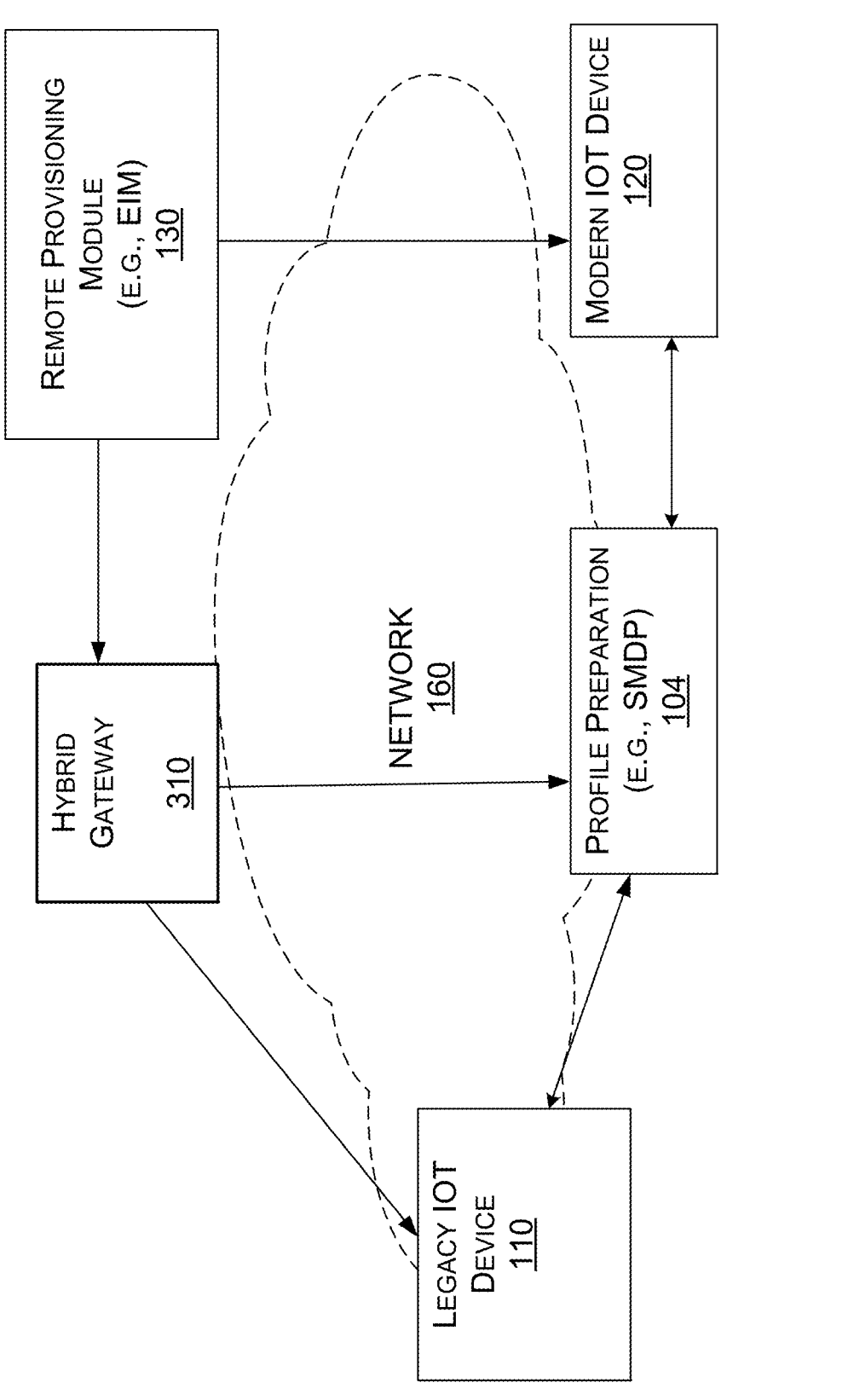
FIG. 3 is a block diagram illustrating an example hybrid communication environment in which a hybrid gateway interfaces, via a network, with both a legacy IoT device and a modern IoT device, while coordinating with a profile preparation module and a remote provisioning module.

FIG. 3 is a block diagram illustrating a hybrid communication environment in which a hybrid gateway 310 interfaces, via a network 160, with both a legacy IoT device 110 and a modern IoT device 120, while coordinating with a profile preparation module 104 and a remote provisioning module 130. The arrangement depicts an example of how the hybrid gateway 310 enables unified operations across a mixed fleet of device-centric SGP.32 and server-centric SGP.02 devices.

In this embodiment, the remote provisioning module 130 may comprise an eSIM IoT Remote Manager (eIM) that issues device-centric profile state management operations over an IP control interface, such as ESipa carried over HTTP, CoAP, or MQTT. The profile preparation module 104 may correspond to an SM-DP or SM-DP+, depending on the transaction. For modern SGP.32 workflows, the module 104 may generate a Bound Profile Package (BPP) and expose it over a secure download interface, such as ES9+ transported over TLS or DTLS.

In addition to emitting device-centric results to the remote provisioning module 130, the hybrid gateway 310 may publish lifecycle events to a discovery and event distribution service, such as a Subscription Manager-Discovery Service (SM-DS). Event publication may enable ecosystem components, including OSS/BSS systems and operator backends, to subscribe to standardized notifications of profile state transitions, success and failure outcomes, and reconciliation events across both legacy and modern fleets.

In some embodiments, the hybrid gateway 310 may publish state custodianship events to the remote provisioning module 130 and, optionally, to a discovery service such as SM-DS, including initiation accepted, bundle delivery progress, and installation confirmed, thereby providing consistent observability for asynchronous transactions spanning multiple satellite contact windows.

For communications involving the modern IoT device 120, the remote provisioning module 130 interacts with the device over the IP control interface without routing through the gateway's southbound legacy functions. The modern device 120 includes a local assistant module, such as an IoT Profile Assistant (IPA), that listens for ESipa triggers sent by the remote provisioning module 130 and, upon instruction, independently establishes a secure session with the profile preparation module 104 to pull a BPP. The modern device 120 may then install the profile into its eUICC and reports progress and completion status directly to the remote provisioning module 130 over the same IP control interface.

For communications involving the legacy device 110, the hybrid gateway 310 presents a northbound interface (e.g., network facing) that is compatible with the remote provisioning module 130 and a southbound interface (e.g., device facing) that is compatible with legacy device 110. Northbound, the gateway 310 behaves as a virtual device-side assistant for legacy members of the fleet by receiving commands (e.g., ESipa) from the remote provisioning module 130 and returning results, thereby allowing the remote provisioning module 130 to treat legacy devices as if they were modern devices. Southbound, the gateway 310 emulates secure-routing semantics by translating device-centric (e.g., "modern") operations into server-centric (e.g., "legacy") operations and by constructing application protocol data unit (APDU) sequences for delivery to the secure chip of the legacy device 110 under a secure channel. As an illustrative example, a disable-profile operation may be serialized into APDUs that first select the issuer security domain and then target the specific profile's security domain. The sequence may include a SELECT command, such as 00 A4 04 00 . . . to establish context, followed by a SET STATUS instruction, such as 80 F0 01 00 . . . configured to mark the target ISD-P disabled. Similarly, an enable-profile operation may issue a SELECT for the target ISD-P and a SET STATUS to mark that profile active, and, where policy dictates, a complementary SET STATUS to disable a previously active profile.

In some embodiments, the hybrid gateway 310 may perform identifier virtualization by generating and maintaining a virtual identifier, such as a virtual EID or virtual IPA ID, for each legacy device and binding the virtual identifier to physical card identifiers (e.g., an Integrated Circuit Card Identifier (ICCID) and/or an eUICC Identifier (EID)) and profile security domains in an internal state database. This binding enables the remote provisioning module 130 to address and manage legacy devices using uniform addressing semantics. In some implementations, a virtual identifier manager within the hybrid gateway 310 may issue, revoke, and/or rebind virtual identifiers, such as virtual EIDs or virtual IPA identifiers. The virtual identifier manager may enforce a namespace policy with collision detection and resolution, maintain lifecycle state for each virtual identifier, and/or bind identifiers at a granularity that includes individual profile security domains (ISD-P) on a single eUICC, thereby enabling device-centric addressing of multiple profiles resident on the same card. An ISD-P may comprise an Issuer Security Domain-Root (ISD-R) that anchors the trust relationship between a card and its routing entity and/or an Issuer Security Domain-Profile (ISD-P) that hosts an individual operator profile on the eUICC.

In trusted proxy deployments, the hybrid gateway 310 may perform on-the-fly profile format transcoding to bridge modern payloads to legacy card formats. In such embodiments, the gateway 310 may ingest a Bound Profile Package from the profile preparation module 104, decapsulate the bundle within a trusted boundary, parse profile elements, repackage the elements into legacy installable structures (e.g., INSTALL, LOAD, and STORE DATA messages), and re-encrypt the transformed payload for delivery under SCP80 or SCP81 to the legacy IoT device 110. The trusted boundary may be implemented by a hardware security module (HSM), a tamper-resistant cryptographic device used to store keys and perform secure operations. Cryptographic materials, transient plaintext, and key operations may be confined to the HSM enclave and may be subject to access control and audit. The transcoding environment may comply with GSMA SAS requirements and, in some deployments, the gateway 310 may be operated within an operator core or a certified SM-DP+ hosting perimeter to preserve the chain of trust.

Figure 4A:
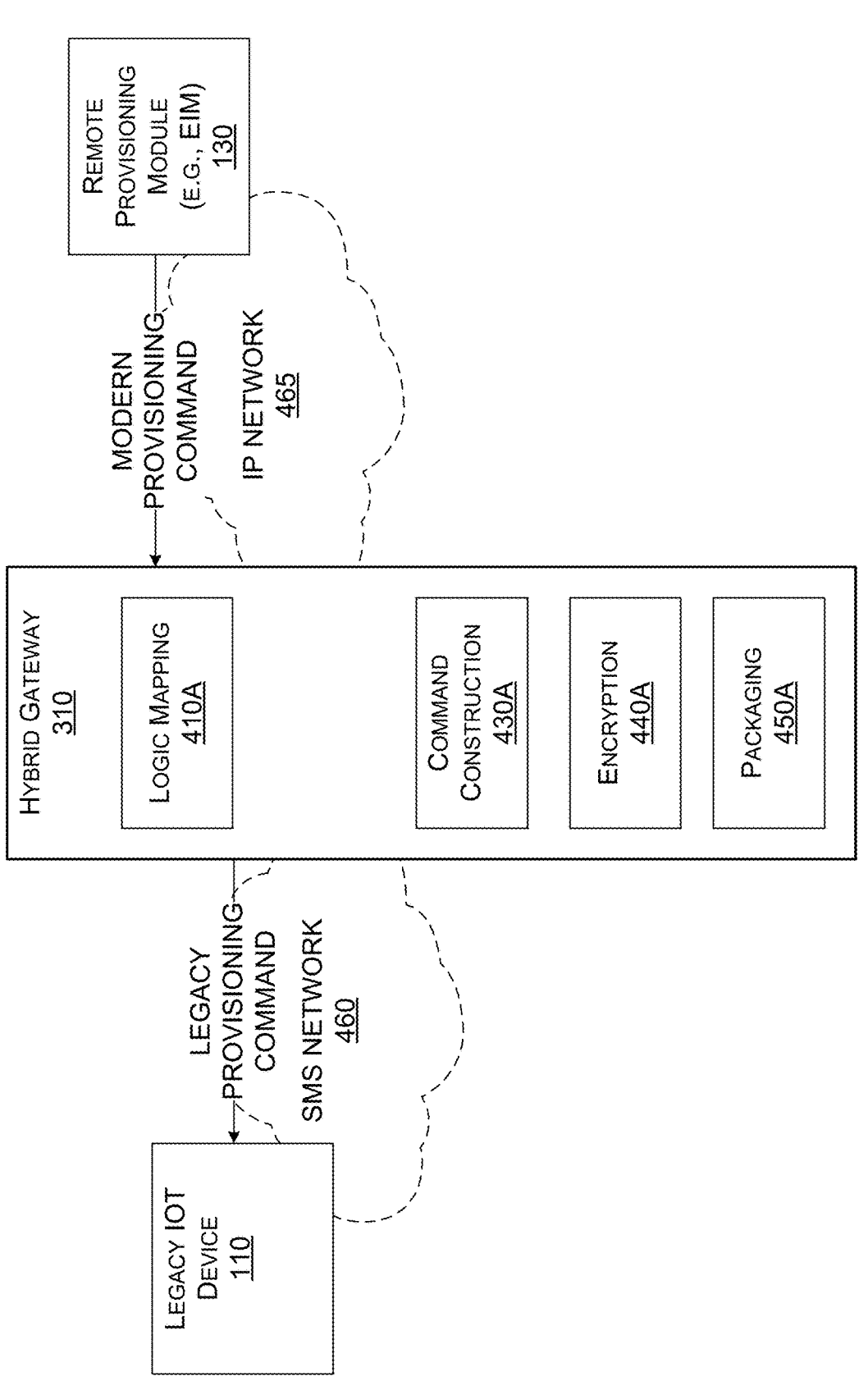
FIG. 4A is a block diagram illustrating example internal components of an example hybrid gateway that implements protocol translation and secure-routing functions for communications with legacy IoT devices.

FIG. 4A is a block diagram illustrating internal components of an example hybrid gateway 310 that implements protocol translation and secure-routing functions for communications with legacy IoT devices. In this example, the hybrid gateway includes:

a logic mapping component 410A configured to interpret device-centric commands and determine corresponding legacy operations, a command construction component 430A configured to generate legacy code (e.g., ISO 7816 APDU sequences) for execution by an eUICC of a the legacy device 110, an encryption component 440A configured to apply secure messaging under a secure channel protocol, and a packaging component 450A configured to encapsulate protected payloads for transport over legacy messaging paths.

For communications involving the legacy IoT device 110, the gateway 310 may include logic for mapping, command construction, encryption, and transport packaging. Upon receipt of a modern command (e.g., SGP.32) by the hybrid gateway 310, a logic mapping component 410A determines the device type and current profile state of the target device, and maps the device-centric intent to a corresponding legacy command, such as an SGP.02 operation or a functionally equivalent proprietary or operator-specific secure-routing command sequence implemented over SMS-PP/SCP80 or TCP/SCP81, including vendor-defined INSTALL/LOAD/STORE DATA and SET STATUS workflows used by older M2M devices that lack a device-centric IP pull capability.

In some embodiments, the logic mapping component 410A automatically serializes multi-step lifecycle transitions required by card policy. For example, responsive to a device-centric 'set-active' operation, the gateway 310 may generate an ordered sequence that first disables a currently active profile before enabling the target profile, ensuring policy conformance on the legacy eUICC.

The command construction component 430A may then generate the legacy code (e.g., an APDU sequence) to implement the mapped operation (e.g., the legacy command), such as selecting an issuer security domain, installing or loading profile files, personalizing parameters, or issuing set-status instructions to enable, disable, or delete a profile. The encryption component 440A may then apply secure messaging using a secure channel protocol, such as SCP80 over SMS-PP or SCP81 over TCP, based on a keyset shared with the legacy device 110 (e.g., the eUICC of the legacy device 110). For example, the hybrid gateway 310 may integrate with carrier Short Message Service Centers (SMSC) and IP-SMS gateways to deliver and receive binary SMS payloads. The hybrid gateway 310 may consume delivery reports, implement per-operator throttling, and/or employ fallback routing across multiple SMSC connections to improve reliability. Where supported, IP-SMS may be used to reduce latency and increase throughput for long APDU sequences. As an example, the gateway 310 may serialize a set-active transition into: SELECT ISD-P (active) followed by SET STATUS (disable), then SELECT ISD-P (target) followed by SET STATUS (enable), with representative APDUs including 00 A4 04 00 . . . to select the relevant issuer security domain and 80 F0 01 00 . . . to apply the set-status operation.

In some implementations, the mapped legacy operation corresponds to an ES5 operation in SGP.02. For example, an ESipa disable-profile command may be mapped to an ES5 disable-profile operation implemented as a sequence of APDUs that select the relevant issuer security domain and apply a SET STATUS to the target ISD-P. Similarly, an ESipa trigger-profile-download command may be mapped to an ES5 download-profile operation implemented as INSTALL/LOAD and STORE DATA messages followed by set-status instructions to activate the installed profile.

The packaging component 450A may then encapsulate the protected payload in a transport appropriate for the legacy device, such as a binary SMS or a proprietary TCP packet, for transmission across the network 160. While SMS-PP and TCP/IP are common SGP.02 transports, the packaging component 450A may also support vendor-specific proprietary TCP or UDP channels for certain legacy devices. The packaging component 450A may segment long APDU sequences into appropriately sized fragments and apply chaining policies dictated by the device's transport capabilities to reduce retransmissions and improve end-to-end reliability.

In some implementations, the logic mapping component 410A may embody explicit lifecycle rules for multi-profile transitions, including disabling an active profile before enabling a target profile, preventing deletion of a profile with outstanding dependencies, and/or enforcing minimum dwell times between state changes. Where permissible by card policy, the gateway may support transactional rollback when a multi-step sequence fails, restoring the eUICC to a consistent prior state.

In some implementations, the hybrid gateway 310 may incorporate operational controls including per-device and/or per-operator queueing, rate-limiting, and/or exponential backoff strategies tuned to network reachability and device behavior. Administrative functions may include maintenance windows, and device or operator blacklisting and whitelisting during fault conditions, with deferred execution queues to align operations with business policies.

In some implementations, policy-aware serialization may be implemented to enforce lifecycle policies. For example, responsive to a request to set a target profile active, the logic mapping component 410A may serialize operations such that a currently active profile is disabled before enabling the target profile, thereby preserving operator policy and card constraints. For example, the logic mapping component 410A may constructs an ordered APDU sequence that disables the currently active profile prior to enabling the target, and the command construction component 430A encodes the sequence as SELECT/SET STATUS instructions directed to the appropriate ISD-P domains, thereby preserving operator policy and card constraints.

In trusted proxy embodiments, the hybrid gateway 310 may include a transcoding module that ingests a Bound Profile Package from the profile preparation module 104, decapsulates the payload within a trusted boundary, constructs legacy INSTALL, LOAD, and STORE DATA messages, and re-seals the transformed payload for delivery under SCP80 or SCP81. To reinforce security of the trusted proxy model, the transcoding module may execute within an HSM-backed secure enclave. Private keys and session secrets used to terminate ES9+ and to seal SGP.02 payloads under SCP80 or SCP81 may remain inside the HSM boundary, and plaintext profile content is not exposed outside the enclave. The deployment may adhere to GSMA SAS-SM controls, including periodic audits, key lifecycle management, and operational segregation consistent with industry accreditation.

The packaging component 450A may further implement rate-limiting, retry scheduling, and segmentation of long APDU sequences based on network conditions, device reachability, and policy inputs The legacy IoT device 110 executes the APDU sequence under the established secure channel and returns a mobile-originated response, for example a proof-of-receipt or response APDU carrying status words such as "90 00" for success, which the gateway 310 decrypts, interprets, and reports back to the remote provisioning module 130 over the IP control interface while updating an internal record of the resultant profile state.

As one example implementation, in a trusted-proxy embodiment the hybrid gateway 310 may perform on-the-fly profile format transcoding between a device-centric SGP.32 workflow and a server-centric SGP.02 card format. The process may begin when the remote provisioning module 130 (eIM) issues a device-centric trigger over an IP control interface (ESipa) instructing installation of a new profile for a legacy IoT device 110. In response, the profile preparation module 104 operating as an SM-DP+ generates a Bound Profile Package (BPP) and encrypts it to keys associated with a virtual identifier managed by the hybrid gateway 310, such as a virtual EID or virtual IPA identity, such that the profile preparation module 104 perceives the gateway 310 as a modern IPA endpoint. The BPP may then be delivered to the hybrid gateway 310 (e.g., over ES9+) via the network 160, where, inside a trusted boundary, the gateway uses private keys corresponding to the virtual eUICC identity to decrypt the BPP and obtain the profile elements, including file system structures, network access applications, and MNO security domain data. The hybrid gateway 310 may then parse the decrypted elements and constructs legacy SGP.02 installables by generating ISO 7816 APDUs, such as INSTALL [for load], LOAD, and STORE DATA messages, and preparing subsequent SET STATUS operations directed to the appropriate issuer security domain for the target profile on the legacy IoT device 110. Next, the hybrid gateway 310 establishes a secure channel to the eUICC of the legacy IoT device 110 using the device's shared keyset and applies secure messaging, e.g., SCP80 for SMS-PP or SCP81 for TCP, to protect the APDU sequence. The protected payload may be encapsulated for the selected southbound transport, e.g., binary SMS or a proprietary TCP format, and transmitted over the network 160 to the legacy IoT device 110. The device executes the APDUs under the secure channel, installs and personalizes the profile, and returns proof-of-receipt or response APDUs, such as a 90 00 status word, to the hybrid gateway 310, which decrypts the responses, maps the status words to device-centric ESipa results, updates its internal eUICC information set, and reports completion to the remote provisioning module 130.

In embodiments performing on-the-fly profile format transcoding, the trusted boundary may be realized via an HSM, and sensitive cryptographic materials and transient plaintext may be confined to that enclave. The gateway 310 may be operated in compliance with GSMA SAS requirements (e.g., SAS-SM), including enforced separation of duties, controlled physical and logical access, auditable key management, and monitored operational processes to sustain the chain of trust across ES9+ termination and SCP-protected southbound delivery.

Because the hybrid gateway 310 may process profile content in plaintext during transcoding, it may be deployed as a high-security component. Cryptographic materials and transient plaintext may be confined to a secure enclave, such as a hardware security module, with strict access control and auditing, which may be operated within a GSMA SAS-SM certified environment and, in some deployments, within an operator core or a certified SM-DP+ hosting perimeter to preserve the chain of trust.

Figure 4B:
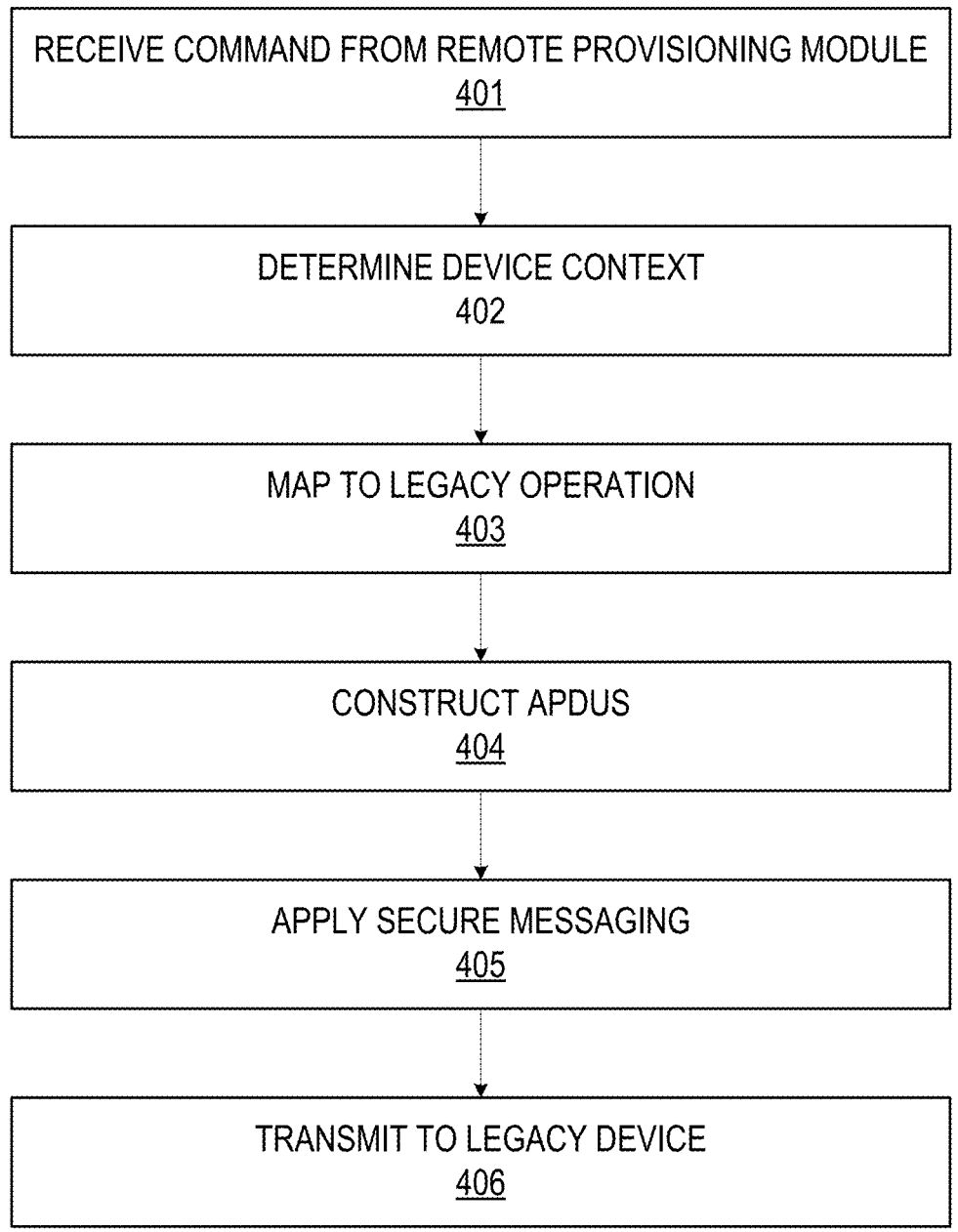
FIG. 4B is a flowchart illustrating an example of operations performed by a hybrid gateway to deliver a device-centric command to a legacy device.

FIG. 4B is a flowchart illustrating an example of operations performed by a hybrid gateway to deliver a device-centric command to a legacy device 110. In other embodiments, other hardware components may perform some or all of the blocks. Additionally, depending on the embodiment, the method of FIG. 4B may include fewer, additional, and/or different blocks.

Beginning at block 401, the hybrid gateway 310 receives a command from the remote provisioning module 130, e.g., over an IP control interface, such as an ESipa request to download, enable, disable, or delete a profile.

Next, at block 402, the hybrid gateway 310 determines device context, such as a device type, physical card identifiers, and/or a current profile state derived from an internal eUICC information set.

At block 403, the hybrid gateway 310 maps the device-centric intent to a corresponding legacy server-centric operation compatible with SGP.02 management of issuer security domains.

At block 404, the hybrid gateway 310 generates a legacy command, such as an ISO/IEC 7816 APDU command sequence, that implements the mapped operation. For example, the hybrid gateway 310 may select an issuer security domain, issue INSTALL/LOAD/STORE DATA messages, and prepare set-status instructions directed to a profile security domain.

Moving to block 405, the hybrid gateway 310 applies secure messaging to the APDU sequence under a secure channel protocol shared with the eUICC, such as SCP80 for SMS-PP transport or SCP81 for TCP transport, based on a keyset maintained by the gateway 310.

At block 406, the hybrid gateway 310 encapsulates the protected payload in an appropriate transport message, for example a mobile-terminated binary SMS or a proprietary TCP packet, and transmits the message across the network 160 toward the legacy IoT device 110 for execution under the established secure channel.

FIG. 5A is a block diagram illustrating internal components of the hybrid gateway 310 configured to receive, interpret, and relay legacy reporting information from a legacy IoT device 110 to a remote provisioning module 130 over an IP network 465. The diagram depicts how the gateway 310 ingests mobile-originated responses arriving via an SMS network 460, processes them through decryption and parsing stages, maps legacy semantics to device-centric results, and emits modern reporting information over the IP control interface, while maintaining persistent audit logs.

In the illustrated embodiment, the hybrid gateway 310 includes a logic mapping component 410B, a command construction component 430B, a decryption component 440B, a packaging component 450B, and a logging component 470. In one example, the legacy IoT device 110 transmits legacy reporting information, such as Proof-of-Receipt (POR) or response APDUs, over the SMS network 460 to the gateway 310. The decryption component 440B first validates and decrypts the received payload using a secure channel protocol keyset (e.g., SCP80 for SMS-PP) that is shared between the gateway 310 and the eUICC of the legacy device 110. Upon successful integrity verification and decryption, the logic mapping component 410B parses the response APDU, extracts the status words (for example, 90 00 indicating success or 69 85 indicating usage conditions not satisfied), and maps those legacy status codes to a device-centric result model suitable for reporting over the IP network 465.

The packaging component 450B then constructs a modern reporting message for the remote provisioning module 130, such as an ESipa result encoded in JSON that includes a status field, a transaction identifier, and optional diagnostics. In some implementations, the command construction component 430B may correlate the response to a pending transaction record. The gateway 310 transmits the modern reporting information to the remote provisioning module 130 over the IP network 465, for example via ESipa carried over HTTP or CoAP, thereby completing the asynchronous transaction loop initiated by a prior device-centric command.

Throughout this process, the logging component 470 records audit metadata, including timestamps, device and card identifiers, the decrypted status words, and the resulting mapped outcome, to maintain audit trail continuity and support reconciliation of the gateway's internal state with the expected profile state on the eUICC. If the mapped outcome indicates a non-success condition, the logic mapping component 410B may generate an error result with a standardized error code and human-readable explanation for delivery to the remote provisioning module 130, and the logging component 470 records the exception along with retry or remediation hints. In this manner, FIG. 5A illustrates how the hybrid gateway 310 bridges legacy reporting semantics conveyed over SMS-based secure messaging to modern, IP-based fleet management interfaces while preserving security, correctness, and end-to-end observability.

Figure 5B:
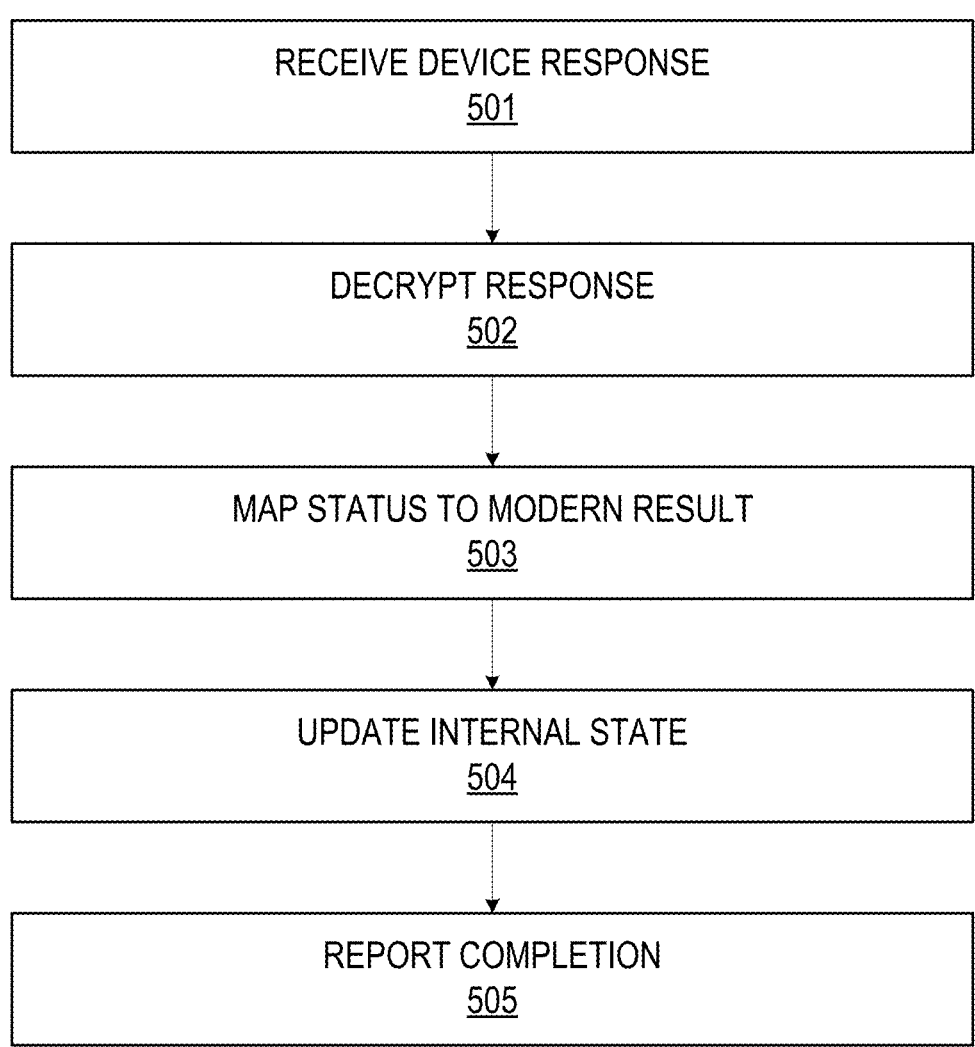
FIG. 5B is a flowchart illustrating example operations performed by the hybrid gateway to process legacy reporting

FIG. 5B is a flowchart illustrating example operations performed by the hybrid gateway 310 to process legacy reporting information from a legacy device 110 and emit a device-centric result to a remote provisioning module 130. In other embodiments, other hardware components may perform some or all of the blocks, and the method may include fewer, additional, and/or different blocks.

Beginning at block 501, the hybrid gateway 310 receives a mobile-originated message from the legacy device 110 over the network 160, such as an SMS-MO carrying a response APDU or Proof-of-Receipt generated under a previously established secure channel.

At block 502, the hybrid gateway 310 validates and decrypts the received payload using a secure channel protocol keyset shared with the eUICC of the legacy device 110, for example SCP80 for SMS-PP or SCP81 for TCP.

At block 503, the hybrid gateway 310 parses the decrypted response APDU to extract status information, such as a status word of 90 00 indicating success or 69 85 indicating usage conditions not satisfied, and maps the legacy semantics to a device-centric result format suitable for the IP control interface. In some implementations, the logic mapping component 410B may reference a canonical mapping from ISO/IEC 7816 and SGP.02 status words to device-centric result codes and diagnostics. For example, mappings may include standardized success, conditions-not-satisfied, security status not satisfied, wrong length, and/or file not found outcomes, each associated with a human-readable explanation and/or suggested remediation. When processing legacy reporting information for ES5 operations, the logic mapping component 410B may correlate response APDUs to the initiating ES5 operation type (e.g., enable-profile, disable-profile, delete-profile, download-profile, or profile-information query) and convert the resulting status words into device-centric result semantics for reporting over the IP control interface, thereby preserving operation-level context across the translation boundary. In implementations using serialized set-active transitions, the gateway 310 may correlate individual disable and enable responses to a single device-centric transaction context and emits a unified ESipa result to the remote provisioning module 130 once both steps report success.

At block 504, the hybrid gateway 310 updates an internal eUICC information set to reflect the resultant profile state on the secure chip, reconciling any divergence between expected and reported states and correlating the response to a pending transaction record.

At block 505, the hybrid gateway 310 constructs and transmits a modern reporting message over the IP control interface, such as an ESipa result encoded in JSON including a status field and a transaction identifier, to the remote provisioning module 130, to complete the asynchronous transaction loop initiated by the prior device-centric command.

In some implementations, when the internal eUICC information set diverges from the physical state reported by a legacy device 110, the hybrid gateway 310 may initiate automated remediation workflows. Such workflows may include issuing profile information queries, reconstructing expected profile lists, and/or generating corrective APDU sequences to align the card state with the authoritative record, or, where policy dictates, aligning the record with the card's reported reality. Reconciliation decisions and outcomes may be recorded in an audit journal to preserve traceability.

The hybrid gateway 310 may maintain a persistent transaction journal to correlate commands and responses, suppress duplicate processing, and ensure deterministic completion reporting over the IP control interface. Each journal entry may include a correlation identifier, a device or virtual identifier, an operation type, timestamps, and/or the final mapped outcome to ensure at-least-once delivery semantics without duplicated effects.

In some implementations, the hybrid gateway 310 may provide operational metrics for observability, including per-operation success rates, proof-of-receipt latencies, secure channel error rates, SMS delivery statistics, and/or APDU retransmission counts. Trace identifiers may be propagated across northbound and southbound paths to enable end-to-end tracing and integration with OSS/BSS monitoring platforms. Operations Support Systems (OSS) and Business Support Systems (BSS) are generally enterprise/back-office platforms that manage service operations, billing, entitlements, and/or customer workflows.

In some implementations, upstream integration with operations and business support systems (OSS/BSS) may be provided by emitting normalized events and status updates over message buses or APIs, enabling closed-loop processes such as billing, entitlement changes, customer notifications, and/or service assurance workflows to consume real-time provisioning outcomes.

Throughout these operations, the gateway 310 may record audit metadata including timestamps, device and card identifiers, decrypted status words, and mapped outcomes to maintain audit trail continuity.

Telemetry-Based Orchestration

In some embodiments, a telemetry-based orchestration engine ingests device telemetry, such as battery level, signal quality, mobility patterns, cost metrics, device type, and failure history, and computes a suitability score to determine whether to initiate, defer, or sequence profile operations. The remote provisioning module 130 or the hybrid gateway 310 may defer southbound pushes to a legacy IoT device 110 or triggers to a modern IoT device 120 until telemetry indicates favorable conditions. For example, the hybrid gateway 310 may compute a suitability score that defers profile download when a device's battery level falls below a threshold (e.g., 30%) or when signal quality metrics indicate unstable connectivity. When telemetry indicates improved conditions, e.g., as RSSI/RSRP exceeding a configured threshold or a predicted satellite pass within a defined window, the hybrid gateway 310 may initiate the previously deferred operation and record the outcome to adapt future thresholds. Observed outcomes may be recorded to adapt future thresholds and policies, improving success rates and conserving device resources.

Satellite Connectivity

In some implementations, IoT devices may store and use multiple SIM profiles spanning terrestrial carriers and non-terrestrial networks, enabling the device to switch between profiles as coverage, cost, and/or performance conditions change. For example, when a device moves out of cellular range, it may activate a satellite profile to maintain connectivity, and later return to a terrestrial profile when coverage resumes. However, delivering or updating profiles over space links may be challenged by high latency and intermittent visibility windows, which can cause conventional TCP/TLS sessions to fail. For example, delivering a profile over a satellite link may be impeded by the mismatch between standard TCP/TLS session semantics and the physics of non-terrestrial networks. In typical terrestrial configurations, servers and client stacks may be tuned with aggressive inactivity timeouts, e.g., 30 seconds, and expect continuous, low-latency connectivity for handshake completion and sustained data transfer. By contrast, geostationary (GEO) paths exhibit round-trip times approaching or exceeding one second, and low-earth-orbit (LEO) links provide only short, intermittent visibility windows as satellites move rapidly relative to the device. Under these conditions, initial TCP slow-start ramps poorly, TLS handshakes require multiple round trips, and mid-transfer handovers or link fades frequently reset or stall sessions. As a result, a partially downloaded profile may be discarded when the satellite drops below the horizon, forcing the device to restart from zero on the next pass. Repeated timeouts at approximately 30 seconds, coupled with session resets due to satellite movement and variable link quality, produce chronic provisioning failures unless the delivery mechanism is adapted to tolerate delay, fragmentation, and resumption across multiple contacts.

To address these constraints, a DTN gateway provides delay-tolerant networking (DTN) functionality to converts synchronous profile delivery flows into asynchronous store-and-forward operations suitable for non-terrestrial environments. In some implementations, the DTN functionality may be provided entirely or partially by another device, such as the hybrid gateway 310 discussed above. However, for purposes of illustration, the discussion herein will describe the DTN functionality as performed by a DTN gateway.

FIG. 6 is a block diagram illustrating an example environment implementing a store-and-forward delivery architecture for resilient eSIM profile provisioning over intermittent satellite links. In this example, a remote provisioning module 630, such as an eSIM IoT Remote Manager (eIM), communicates over a terrestrial IP network 640 with a DTN gateway 620. The DTN gateway 620 bridges the reliable terrestrial leg and the challenged non-terrestrial leg by accepting custody of profile payloads, fragmenting them into bundles, and scheduling transmissions across a satellite link 650 to an IoT device 610. A profile payload may be fragmented based on one or more link characteristics, such as pass duration, available bandwidth or link rate, latency, error rate, variability due to mobility or visibility windows, and/or any other measurable properties of a non-terrestrial or terrestrial communication link that may influence transmission planning and fragmentation.

In some implementations, the DTN gateway 620 may implement the Bundle Protocol version 7 (BPv7) for store-and-forward delivery and/or apply Bundle Protocol Security (BPSec) to protect bundles traversing non-terrestrial links. Convergence layers optimized for challenged paths, such as the Licklider Transmission Protocol (LTP) or UDP Convergence Layer (UDPCL), may be used on the space leg. Contact-plan-aware routing and scheduling may be implemented via Contact Graph Routing (CGR), enabling deterministic selection of transmission opportunities based on ephemeris-derived visibility windows and available bandwidth.

In some embodiments, the DTN gateway 620 operates as a state custodian for device-centric transactions initiated over the IP control interface. In some implementations, upon accepting custody of a profile package or control payload, the DTN gateway 620 maintains the asynchronous state of the SGP.32 transaction throughout fragmentation and multipass delivery, ensuring that the remote provisioning module 630 observes a successful initiation while the physical delivery proceeds across multiple contact windows. The DTN gateway may record transaction metadata and progress checkpoints and reconcile final installation outcomes with upstream session context upon completion.

In operation, the remote provisioning module 630 initiates a profile operation (for example, a trigger to download or update a profile) and uploads the associated profile package or control payload to the DTN gateway 620 over a reliable IP path within network 640. The DTN gateway 620 may acknowledge custody so that the remote provisioning module 630 can close its session without holding a long-lived TCP/TLS connection. The DTN gateway 620 may then segment the profile package into delay-tolerant bundles sized for expected satellite contact windows. The DTN gateway may include a scheduler that determines when to transmit each fragment based on predicted satellite visibility, such as may be provided by the satellite service provider. As an illustrative example, a contact-plan-aware scheduler may determine that Device A will be visible at 14:02 UTC for approximately eight minutes. The DTN gateway 620 prestages Device A's bundles in the transmission buffer at 14:01 UTC and begins transmission immediately at pass start to maximize throughput within the short visibility window.

During each visibility window over the satellite link 650, the DTN gateway 620 forwards as many bundles as link conditions permit toward the IoT device 610. A device-side DTN agent on the IoT device 610 caches received fragments in non-volatile storage and, upon subsequent passes, resumes reception from the last acknowledged fragment rather than restarting the transfer. When all fragments have been received and integrity-checked, the device-side DTN agent may perform an atomic handoff of the reassembled payload to the device's local assistant (e.g., an IPA) for installation into the eUICC. Security may be preserved either by encapsulating end-to-end TLS records within bundles or by terminating TLS at a trusted proxy boundary within the DTN gateway 620 and applying bundle-level security on the satellite leg. To minimize upstream timeouts while awaiting the next pass, the DTN gateway 620 may emit synthetic keep-alives or implement session-freeze semantics toward the remote provisioning module 630. For example, when an upstream server enforces an inactivity timeout near thirty seconds, the DTN gateway 620 may emit synthetic keep-alive messages at intervals tuned to server expectations while awaiting the next visibility window, thereby suppressing premature session termination during multi-pass delivery.

In this manner, FIG. 6 depicts how the DTN gateway 620 converts a fragile, synchronous download into a resilient, asynchronous, multi-pass delivery across the satellite link 650, improving success rates for devices 610 that must provision profiles beyond terrestrial coverage.

In some implementations, to maximize use of short visibility windows, the DTN gateway 620 may proactively prefetch profile packages from the remote provisioning module 630 or the profile preparation module 104 in advance of scheduled passes so that payloads are staged for immediate transmission. In some embodiments, the DTN gateway 620 may compute and deliver binary differentials relative to an installed profile, thereby reducing the total transmitted volume and improving completion likelihood within limited contact windows.

When encapsulating ES9+ sessions within DTN bundles, the DTN gateway 620 may account for default TLS inactivity timeouts common in terrestrial environments. For example, the DTN gateway 620 may either encapsulate end-to-end TLS records without requiring extended timeouts or, in trusted proxy configurations, terminate TLS at the gateway and apply BPSec on the satellite leg, thereby avoiding upstream timeout constraints while preserving security on the space path.

FIG. 7 is a flowchart illustrating an example method of store-and-forward delivery of eSIM profile packages over intermittent satellite links. In some implementations, the blocks of FIG. 7 are performed by a DTN gateway, while in others the blocks may be performed by a hybrid gateway and/or other devices. For example, in a resource constrained device, DTN functions such as fragmentation, caching, and/or reassembly may be hosted on a communication module or modem. Offloading DTN logic to a modem with greater memory and processing capacity may preserve host processing resources while maintaining the device-side agent's ability to perform atomic handoff to the IPA. Depending on the embodiment, the method of FIG. 7 may include fewer, additional, and/or different blocks. For example, different implementations may or may not include per-bundle fragmentation, contact-plan-aware scheduling, acknowledgments, resumption across passes, integrity verification, and/or atomic installation on the device.

Beginning at block 701, the DTN gateway receives a profile package from a remote provisioning module over a terrestrial IP path. In response, the gateway accepts custody of the package so the upstream session can be closed without holding a long-lived TCP/TLS connection. The gateway persists the payload and related metadata, including a transaction identifier and bundle manifest. In some implementations, when custody is accepted, the DTN gateway may emit an initiation acknowledgment to the remote provisioning module indicating that the transaction has commenced, while the DTN gateway transitions the transaction into an asynchronous state managed by the contact-plan-aware scheduler. The remote provisioning module may thus retain a consistent view of transaction progress even when delivery is deferred or distributed across multiple passes.

Next, at block 702 the DTN gateway fragments the payload into bundles sized for expected satellite contact windows. Fragmentation parameters may be derived from link characteristics and policy inputs and produce a manifest identifying bundle indices, checksums, and ordering. As an illustrative example, a 500-kilobyte profile package may be fragmented into 50-kilobyte bundles sized to fit within expected visibility windows. During a low-earth-orbit pass, if only six bundles are delivered before loss of visibility, the device-side DTN agent may persist those fragments and, on the next pass, resume from the last acknowledged bundle rather than restarting the transfer.

At decision block 704, the DTN gateway evaluates whether all bundles have been delivered. If not all bundles have been delivered, the method proceeds to decision block 705 to determine whether a satellite pass is available. If all bundles have been delivered, the delivery is complete and the method proceeds to block 708.

At decision block 705, the DTN gateway checks for satellite availability, such as by using a scheduler that predicts visibility windows from operator schedules or ephemeris data. If a pass is available, the method proceeds to block 706. If a pass is not available, the process proceeds to block 707.

At block 706, during an available satellite pass the DTN gateway transmits one or more bundles over the satellite link toward the IoT device. Transmission may use a convergence layer optimized for challenged links (e.g., LTP or UDP-based layers) and apply bundle-level security when operating in a trusted proxy configuration. A device-side DTN agent may acknowledge received bundles, cache fragments in non-volatile storage, and record progress so reception can resume from the last acknowledged fragment on subsequent passes. If link conditions deteriorate mid-pass, the scheduler may adapt transmission rate and prioritization to maximize delivered fragments before loss of visibility. Similarly, the scheduler may adjust these delivery parameters for future bundles. In another example, the DTN gateway 620 may prioritize bundle transmission based on pass duration and/or link quality, sending smaller bundles first to ensure at least partial delivery when conditions are degraded and deferring larger bundles to subsequent passes projected in the contact plan.

At block 707, while awaiting the next satellite pass the DTN gateway remains idle with respect to space transmission but may emit synthetic keep-alives or session-freeze semantics toward the upstream remote provisioning module to suppress timeouts. The DTN gateway continues to monitor the contact plan and prepares the next tranche of bundles for immediate transmission at pass start. While awaiting a satellite pass, the DTN gateway 620 may implement session-freeze semantics toward the remote provisioning module 630 and apply keep-alive timers tailored to upstream server expectations. Configurable upstream timeout policies may be enforced to prevent premature termination of long-running transactions, and the DTN gateway 620 may replay final status to the remote provisioning module 630 once installation is confirmed by the device.

As a state custodian, the DTN gateway 620 may correlate initiation acknowledgments, per-bundle acknowledgments, and final installation confirmations under a single transaction context. The DTN gateway may emit interim status to the remote provisioning module 630 to reflect bundle delivery progress, and upon installation confirmation by the device's local assistant, transmit a completion status, thereby closing the asynchronous transaction loop without requiring the upstream server to maintain a long-lived, synchronous session.

As noted above, when decision block 704 indicates that delivery is complete, the method proceeds to block 708. At this point, the device-side DTN agent reassembles the full payload from cached fragments and may perform integrity verification using the manifest checksums. If verification succeeds, the agent may perform an atomic handoff of the reassembled profile package to the device's local assistant (IPA) for installation into the eUICC. If verification identifies missing or corrupt fragments, the DTN agent may request retransmission so the process returns to the bundle loop (e.g., block 704) until verification passes.

Throughout these operations, security may be preserved by encapsulating end-to-end TLS records within bundles and/or by terminating TLS at a trusted proxy boundary within the DTN gateway and applying bundle security on the satellite leg. The DTN gateway may maintain transaction journals, bundle delivery statistics, and/or acknowledgments to provide end-to-end observability and to report completion status to the remote provisioning module once installation is confirmed by the IPA. In this manner, FIG. 7 depicts per-bundle, contact-plan-aware store-and-forward mechanism that transforms a fragile, synchronous profile download into a resilient, asynchronous, multi-pass delivery across intermittent satellite links.

In embodiments that include state custodianship for asynchronous transactions, the persistent transaction journal maintained by the hybrid gateway 310 or DTN gateway 620 may record upstream initiation acknowledgments, interim progress checkpoints, per-bundle acknowledgments, and/or final installation outcomes. This journal allows the gateway to present a consistent, device-centric transaction view to the remote provisioning module while coordinating fragmented deliveries and reconciling final device state.

Example Fragmentation Implementation

As an example, a single Bound Profile Package of approximately one megabyte is fragmented into multiple BPv7 bundles to support delay-tolerant delivery and resumable installation over intermittent satellite links. Each bundle may carry minimal sequence metadata, including a bundle index, a total bundle count, and integrity information such as per-bundle checksums and a manifest digest. A contact-plan-aware scheduler associates bundles with predicted satellite visibility windows derived from ephemeris or operator schedules, and the DTN gateway may pre-stage bundles so transmission begins immediately at pass start to maximize utilization of short windows. During each pass, the gateway transmits as many bundles as link conditions permit and the device-side DTN agent acknowledges reception per bundle, caching received fragments in non-volatile storage and recording the last-acknowledged index.

When visibility is lost mid-transfer, previously acknowledged fragments are retained on the device, and on the next pass the DTN gateway resumes transmission from the last-acknowledged index rather than restarting the sequence. Once all bundles have been received, the device-side DTN agent reassembles the full payload and verifies integrity using the manifest and checksums. If verification identifies missing or corrupt fragments, the agent requests retransmission of only the identified bundles and resumes at the correct index thereafter. When integrity checks pass, the agent performs an atomic handoff of the reassembled profile package to the device's local assistant (IPA) for secure installation into the eUICC, thereby preventing partial installs and reducing the risk of device failure. Security may be preserved by encapsulating end-to-end TLS records within BPv7 bundles or, in trusted proxy configurations, by terminating TLS at the DTN gateway and applying bundle-level security on the satellite leg.

FIG. 8 is a block diagram that illustrates a computer system 800 upon which various embodiments of the systems and/or processes illustrated in the figures and/or discussed herein may be implemented. For example, in various examples, a hybrid gateway, DTN gateway, IoT device, and/or other devices discussed herein may be implemented with some or all of the components of the example computer system 800. Computer system 800 includes a bus 802 or other communication mechanism for communicating information, and a hardware processor, or multiple processors, 804 coupled with bus 802 for processing information. The hardware processor(s) 804 may be, for example, multi-core processors, specialized processors such as graphic processing units (GPUs), and/or general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 809 or other static storage device coupled to bus 802 for storing static information and instructions for processor 804. A storage device 810, such as a solid-state drive (SSD), magnetic disk, optical disk, or USB thumb drive (Flash drive), etc., is provided and coupled to bus 802 for storing information and instructions.

Computer system 800 may be coupled via bus 802 to a display 812, such as a high-definition display or touch-screen, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine.

In some implementations, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804. Instructions may initially be stored on a remote cloud server (e.g., a Backend) and transmitted over the Internet to computer system 800.

Computer system 800 also includes a communication interface 819 coupled to bus 802. Communication interface 819 provides a two-way data communication coupling to a network link 820 that is connected to a local network 822. For example, communication interface 819 may be an integrated services digital network (ISDN) card, cable modem, satellite modem, or a modem to provide a data communication connection to a corresponding type of telephone line. As another example, communication interface 819 may be a local area network (LAN) card to provide a data communication connection to a compatible LAN (or WAN component to communicate with a WAN). Wireless links may also be implemented. In any such implementation, communication interface 819 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 829. Local network 822 and Internet 829 both use electrical, electromagnetic or optical signals that carry digital data streams. The signals through the various networks and the signals on network link 820 and through communication interface 819, which carry the digital data to and from computer system 800, are example forms of transmission media.

Computer system 800 can send messages and receive data, including program code, through the network(s), network link 820 and communication interface 819. In the Internet example, a cloud server 830 might transmit a requested code for an application program through Internet 829, ISP 826, local network 822 and communication interface 819. The received code may be executed by processor 804 as it is received, and/or stored in storage device 810, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A method of managing a SIM profile on a legacy IoT device using a hybrid protocol gateway, the method comprising, by the hybrid protocol gateway: receiving a remote provisioning command over an IP control interface from a remote provisioning module, the command specifying a target identifier associated with a secure chip of a device; determining a device type and current state of the device; mapping the command to a corresponding legacy command; generating legacy code compatible with an eSIM card of the device; generating an SMS message including the legacy code; and transmitting the SMS message to the device, wherein the device is configured to execute the legacy code to implement the remote provisioning command.

Clause 2. The method of clause 1, wherein the remote provisioning command complies with SGP.32 standard.

Clause 3. The method of clause 1, wherein the generated legacy code complies with SGP.02 standard.

Clause 4. The method of clause 1, wherein the legacy code comprises one or more application protocol data unit (APDU) commands.

Clause 5. The method of clause 1, further comprising: encrypting the legacy code prior to generating the SMS message.

Clause 6. The method of clause 1, wherein said transmitting is over a cellular network.

Clause 7. The method of clause 1, wherein the IP control interface comprises ESipa carried over HTTP or CoAP.

Clause 8. The method of clause 1, wherein the device type and the current state are determined based on an internal state database.

Clause 9. The method of clause 1, wherein the command comprises a device-centric disable-profile operation and the legacy code comprises an ES5 disable-profile operation.

Clause 10. The method of clause 1, wherein the command comprises a device-centric enable-profile operation and the legacy code implements an ES5 enable-profile operation.

Clause 11. The method of clause 1, wherein the command comprises a device-centric delete-profile operation and the legacy code implements an ES5 delete-profile operation.

Clause 12. The method of clause 1, wherein the command comprises a device-centric trigger-profile-download operation and the legacy code implements an ES5 download-profile operation including INSTALL/LOAD and STORE DATA messages.

Clause 13. The method of clause 1, wherein the command comprises a device-centric query-profile-state operation and the legacy code implements an ES5 profile-information operation including SELECT and GET STATUS messages directed to a profile security domain.

Clause 14. The method of clause 1, wherein the command comprises a device-centric list-profiles operation and the legacy code implements an ES5 enumeration operation to identify available profile security domains on the secure chip.

Clause 15. The method of clause 1, wherein the command comprises a device-centric set-active-profile operation and the legacy code implements an ES5 operation that enables a target profile security domain and disables a currently active profile according to a policy.

Clause 16. The method of clause 1, further comprising: encrypting the legacy code using a keyset shared between the hybrid protocol gateway and the secure chip of the legacy IoT device.

Clause 17. The method of clause 1, wherein the remote provisioning module comprises an eSIM IoT Remote Manager.

Clause 18. The method of clause 1, further comprising: logging transaction metadata including timestamps, command identifiers, and response status words to maintain audit trail continuity.

Clause 19. The method of clause 1, wherein mapping the command comprises: automatically serializing a set-active operation into an ordered legacy sequence that disables a currently active profile security domain prior to enabling a target profile security domain, and wherein generating the application protocol data unit command sequence comprises constructing SELECT and SET STATUS instructions directed to the corresponding issuer security domains.

Clause 20. A method of reporting a SIM profile operation on a legacy IoT device using a hybrid protocol gateway, the method comprising, by the hybrid protocol gateway: receiving from the legacy IoT device, over a cellular network, a mobile-originated message including a response application protocol data unit (APDU) associated with a secure chip of the legacy IoT device; decrypting the APDU using a secure channel protocol keyset shared between the hybrid protocol gateway and the secure chip; mapping a status word included in the decrypted APDU to a result message with an IP control interface; updating an internal information set to reflect a resultant profile state on the secure chip; and transmitting, over the IP control interface, the result message to a remote provisioning module indicating completion of the profile operation.

Clause 21. The method of clause 20, wherein the mobile-originated message is encrypted using a secure channel protocol (SCP).

Clause 22. The method of clause 20, wherein the status word comprises a hexadecimal status of 90 00 that is mapped to a result message indicating success.

Clause 23. The method of clause 20, wherein the status word comprises a hexadecimal status of 69 85 that is mapped to a result message indicating usage conditions are not satisfied.

Clause 24. The method of clause 20, wherein the IP control interface comprises ESipa carried over HTTP or CoAP.

Clause 25. The method of clause 20, wherein the result message comprises a JSON object including a status field and a transaction identifier.

Clause 26. The method of clause 20, wherein transmitting the result message comprises sending an ESipa message to an eSIM IoT Remote Manager.

Clause 27. The method of clause 20, further comprising, responsive to a non-success status word, generating an error result including a mapped error code and a human-readable explanation for delivery to the remote provisioning module.

Clause 28. The method of clause 20, wherein updating the internal information set comprises reconciling a previous active profile state with a newly reported disabled state and recording a state transition.

Clause 29. A method of managing and reporting a SIM profile operation on a legacy IoT device using a hybrid protocol gateway, the method comprising, by the hybrid protocol gateway: receiving, over an IP control interface from a remote provisioning module, a device-centric remote provisioning command specifying a target identifier associated with a secure chip of the legacy IoT device; determining a device type and a current profile state of the legacy IoT device; mapping the device-centric remote provisioning command to a corresponding legacy server-centric operation compatible with a secure routing model; generating an application protocol data unit (APDU) command sequence configured to cause the secure chip to perform the legacy server-centric operation; applying secure messaging to the APDU command sequence under a secure channel protocol shared between the hybrid protocol gateway and the secure chip; encapsulating the APDU command sequence in a transport message suitable for delivery to the legacy IoT device and transmitting the transport message over a cellular network; receiving from the legacy IoT device, over the cellular network, a mobile-originated message including a response APDU associated with execution of the legacy server-centric operation; decrypting the response APDU using the secure channel protocol; mapping a status word included in the decrypted response APDU to a device-centric result format compatible with the IP control interface; updating an internal eUICC information set to reflect a resultant profile state on the secure chip; and transmitting, over the IP control interface, a result message to the remote provisioning module indicating completion of the SIM profile operation.

Clause 30. A method of enabling device-centric management of a legacy IoT device using a hybrid protocol gateway, the method comprising, by the hybrid protocol gateway: generating a virtual identifier for the legacy IoT device, the virtual identifier being formatted for use by a remote provisioning module over an IP control interface; storing, in an internal state database, a binding between the virtual identifier and one or more physical card identifiers associated with a secure chip of the legacy IoT device; registering the virtual identifier with the remote provisioning module to permit the legacy IoT device to be addressed using device-centric semantics; receiving, over the IP control interface, a remote provisioning command addressed to the virtual identifier; resolving the remote provisioning command to the one or more physical card identifiers based on the binding stored in the internal state database; and processing the remote provisioning command for the legacy IoT device using server-centric operations compatible with a secure routing model.

Clause 31. The method of clause 30, wherein the remote provisioning module comprises an eSIM IoT Remote Manager and the IP control interface comprises ESipa carried over HTTP or CoAP.

Clause 32. The method of clause 30, wherein generating the virtual identifier comprises issuing at least one of a virtual embedded universal integrated circuit card identifier and a virtual IoT Profile Assistant identifier.

Clause 33. A method of on-the-fly profile transcoding for a legacy IoT device using a hybrid protocol gateway, the method comprising, by the hybrid protocol gateway: receiving, from a profile preparation module over a secure download interface, a Bound Profile Package addressed to a virtual identifier managed by the hybrid protocol gateway; authenticating to the profile preparation module and decrypting the Bound Profile Package within a trusted boundary to obtain profile elements for a secure chip of the legacy IoT device; parsing the profile elements to identify file system structures, network access applications, and profile security domain data; generating a legacy installable payload by generating an application protocol data unit command sequence compatible with a server-centric secure routing model, the application protocol data unit command sequence including one or more of INSTALL, LOAD, and STORE DATA messages and set-status operations directed to a profile security domain on the secure chip; establishing a secure channel protocol with the secure chip using a keyset shared between the hybrid protocol gateway and the secure chip; re-encrypting the legacy installable payload under the secure channel protocol; encapsulating the re-encrypted payload in a transport message suitable for delivery to the legacy IoT device; and transmitting the transport message toward the legacy IoT device for execution to implement a profile installation or state change.

Clause 34. The method of clause 33, wherein decrypting the Bound Profile Package and constructing the legacy installable payload are performed within a trusted boundary implemented by a hardware security module, and wherein cryptographic materials and transient plaintext are confined to the hardware security module enclave in compliance with GSMA Security Accreditation Scheme requirements.

Clause 35. A method of security domain mapping for profile lifecycle control on a legacy IoT device using a hybrid protocol gateway, the method comprising, by the hybrid protocol gateway: receiving, over an IP control interface from a remote provisioning module, a device-centric configuration operation specifying a profile state change for a secure chip of the legacy IoT device; accessing a policy model and an internal state database to determine dependency ordering among multiple profiles on the secure chip; mapping the device-centric configuration operation to a legacy server-centric operation compatible with management of issuer security domains on the secure chip; generating an application protocol data unit command sequence that serializes the legacy server-centric operation into atomic steps directed to issuer security domains, the application protocol data unit command sequence including selection of an issuer security domain and set-status instructions configured to disable a currently active profile before enabling a target profile; applying secure messaging to the application protocol data unit command sequence under a secure channel protocol shared with the secure chip; encapsulating the command sequence in a transport message suitable for delivery to the legacy IoT device; and transmitting the transport message toward the legacy IoT device.

Clause 36. A method of delay-tolerant delivery of a profile package to an IoT device by a DTN gateway, the method comprising, by the DTN gateway: receiving, over a terrestrial IP path, a profile package associated with a remote provisioning transaction; accepting custody of the profile package; fragmenting the profile package into a plurality of bundles based on link characteristics; scheduling transmission of the bundles toward the IoT device based on a contact plan indicating predicted satellite visibility windows; during an available satellite pass, transmitting one or more of the bundles over a non-terrestrial link toward the IoT device; and repeating said scheduling and transmitting until all bundles are transmitted; wherein upon completion of transmission, the IoT device reassembles the profile package.

Clause 37. The method of clause 36, wherein the IoT device is further configured to: verify integrity of received bundles; and responsive to successful verification of all received bundles, causing an atomic handoff of the reassembled profile package to a local assistant on the IoT device for installation into a secure chip.

Clause 38. The method of clause 36, further comprising: receiving acknowledgments from the IoT device indicating successfully delivered bundles.

Clause 39. The method of clause 36, further comprising: maintaining a transaction journal including one or more of a transaction identifier, a bundle index, an acknowledgment state, or timestamps; and using the transaction journal to resume transmission from a last acknowledged bundle on a subsequent satellite pass.

Clause 40. The method of clause 36, wherein said scheduling transmission is based on a contact plan and comprises applying contact-graph-aware selection of transmission opportunities derived from ephemeris data or operator schedules.

Clause 41. The method of clause 36, wherein transmitting the bundles over the non-terrestrial link comprises using a convergence layer optimized for challenged links including at least one of a Licklider Transmission Protocol or a UDP-based convergence layer.

Clause 42. The method of clause 36, further comprising, while awaiting a next satellite pass, emitting keep-alive messages or applying session-freeze semantics toward an upstream server to suppress inactivity timeouts associated with a remote provisioning session.

Clause 43. The method of clause 37, wherein verifying integrity comprises validating checksums or cryptographic digests identified in a bundle manifest and, when verification indicates missing or corrupt fragments, requesting retransmission of identified bundles.

Clause 44. The method of clause 36, wherein accepting custody of the profile package permits closure of an upstream TLS session with a remote provisioning module while the DTN gateway continues store-and-forward operations until installation is completed on the IoT device.

Clause 45. The method of clause 36, further comprising: applying security to the bundles by encapsulating end-to-end TLS records within the bundles.

Clause 46. The method of clause 36, wherein said fragmenting into bundles comprises selecting bundle sizes based on one or more of a pass duration, a link rate, and a policy input.

Clause 47. The method of clause 36, further comprising: performing, prior to an available satellite pass, predictive prefetch of the profile package from at least one of a remote provisioning module or a profile preparation module.

Clause 48. A method of custody-based timeout suppression for delay-tolerant delivery of a profile package to an IoT device using a gateway, the method comprising, by the gateway: receiving, over a terrestrial IP path, a profile package associated with a remote provisioning transaction; accepting custody of the profile package and persisting associated transaction metadata; determining, based on a contact plan indicating predicted satellite visibility windows, that a satellite pass is not available; while awaiting availability of the satellite pass, maintaining a session with an upstream server by transmitting keep-alive or session-freeze messages over a secure transport to suppress inactivity timeouts; and upon availability of the satellite pass, transmitting one or more payload fragments over a non-terrestrial link toward the IoT device.

Clause 49. The method of clause 48, wherein said determining that the satellite pass is not available comprises evaluating a contact plan derived from ephemeris data or operator schedules and computing a next visibility window.

Clause 50. The method of clause 48, wherein the keep-alive or session-freeze messages comprise application-layer messages including correlation and transaction identifiers that allow the upstream server to retain session context without closing the secure transport.

Clause 51. The method of clause 48, further comprising: adjusting keep-alive intervals based on configured upstream timeout policies to prevent premature termination of long-running transactions.

Clause 52. A method of predictive prefetch for delay-tolerant delivery of a profile package to an IoT device using a gateway, the method comprising, by the gateway: analyzing a contact plan indicating future satellite visibility windows to determine an upcoming transmission opportunity for the IoT device; prior to the upcoming transmission opportunity, requesting and receiving, over a terrestrial IP path, a profile package associated with a remote provisioning transaction from at least one of a remote provisioning module or a profile preparation module; accepting custody of the profile package and persisting the profile package with transaction metadata; fragmenting the profile package into bundles sized according to expected pass duration and link characteristics; at pass start, transmitting staged bundles over a non-terrestrial link toward the IoT device according to a schedule derived from the contact plan; and responsive to completion of bundle delivery, causing an atomic handoff of the profile package to a local assistant on the IoT device for installation into a secure chip.

Clause 53. A method of delta-update delivery of a profile package to an IoT device using a gateway, the method comprising, by the gateway: determining a current profile state associated with a secure chip of the IoT device; obtaining a target profile package associated with a remote provisioning transaction; determining, based on the current profile state and the target profile package, a binary differential representing a patch sufficient to transform the current profile state to the target profile package; accepting custody of the binary differential and persisting associated transaction metadata; fragmenting the binary differential into a plurality of bundles according to link characteristics; scheduling transmission of the bundles toward the IoT device based on a contact plan indicating predicted satellite visibility windows; during an available satellite pass, transmitting one or more of the bundles over a non-terrestrial link toward the IoT device; and repeating said scheduling and transmitting until all bundles are acknowledged; wherein a device-side agent of the IoT device is configured to reassemble the binary differential from cached bundles to reconstruct the target profile package.

Clause 54. A method of asynchronous state custodianship for delay-tolerant delivery of a profile package to an IoT device using a gateway, the method comprising, by the gateway: receiving, over a terrestrial IP path, a profile package associated with a device-centric remote provisioning transaction; accepting custody of the profile package and persisting associated transaction metadata; acknowledging initiation of the transaction to an upstream server over an IP control interface to indicate commencement of the transaction; scheduling fragmented transmission of the profile package based on a contact plan indicating predicted satellite visibility windows; during available satellite passes, transmitting bundles of the profile package over a non-terrestrial link toward the IoT device and recording acknowledgments for successfully delivered bundles; maintaining the asynchronous state of the transaction by correlating initiation acknowledgments, per-bundle acknowledgments, and installation confirmation under a single transaction context; and responsive to installation confirmation by a local assistant on the IoT device, transmitting a completion status to the upstream server to close the transaction.

Clause 55. The method of clause 54, wherein acknowledging initiation of the transaction comprises emitting an ESipa message over TLS or DTLS to a remote provisioning module indicating that custody has been accepted and that the transaction will proceed asynchronously.

Clause 56. The method of clause 54, wherein scheduling fragmented transmission based on the contact plan comprises applying contact-plan-aware selection of transmission opportunities derived from ephemeris data or operator schedules and prioritizing bundles according to pass duration and link conditions.

Clause 57. The method of clause 54, further comprising, while awaiting a satellite pass, transmitting keep-alive or session-freeze messages to suppress upstream inactivity timeouts and maintain transaction context without requiring a long-lived synchronous session.

Clause 58. The method of clause 54, further comprising maintaining a transaction journal including one or more of initiation acknowledgments, bundle indices, acknowledgment states, progress checkpoints, or an installation confirmation record, and using the transaction journal to resume transmission from a last acknowledged bundle on subsequent satellite passes.

Clause 59. The method of clause 54, wherein transmitting bundles comprises using a convergence layer optimized for challenged links, and wherein installation confirmation comprises an indication from an IoT Profile Assistant that a reassembled profile package was installed into an embedded Universal Integrated Circuit Card under a secure installation workflow.

Clause 60. A method of session maintenance for delay-tolerant delivery of a profile package to an IoT device using a gateway, the method comprising, by the gateway: receiving, over a terrestrial IP path, a profile package or control payload associated with a remote provisioning transaction; accepting custody of the profile package or control payload and persisting associated transaction metadata; determining, based on a contact plan indicating predicted satellite visibility windows, that a non-terrestrial transmission opportunity is not currently available; while awaiting a satellite pass, maintaining a secure session with an upstream server by transmitting synthetic keep-alive or session-freeze messages over a secure transport to suppress inactivity timeouts; upon availability of the satellite pass, transmitting one or more payload fragments over a non-terrestrial link toward the IoT device; and responsive to completion of delivery and installation confirmation by a local assistant on the IoT device, transmitting a completion status to the upstream server.

Clause 61. The method of clause 60, wherein the upstream server comprises a remote provisioning module and the secure transport comprises ESipa carried over TLS or DTLS.

Clause 62. The method of clause 60, wherein the upstream server comprises a profile preparation module and the secure transport comprises ES9+ carried over TLS or DTLS.

Clause 63. The method of clause 60, wherein maintaining the secure session comprises transmitting synthetic keep-alive messages at intervals selected to remain below configured upstream inactivity timeout thresholds, and wherein the intervals are adjusted based on a timeout policy to prevent premature session termination.

Clause 64. The method of clause 60, wherein the session-freeze messages comprise application-layer messages including correlation and transaction identifiers that instruct the upstream server to retain session context while the satellite leg is offline.

Clause 65. The method of clause 60, further comprising pausing transmission of synthetic keep-alive or session-freeze messages upon commencement of a satellite pass and resuming payload transmission according to the contact plan.

Clause 66. The method of clause 60, further comprising recording synthetic keep-alive transmissions, session-freeze events, and timeout policy parameters in a transaction journal to enable deterministic completion reporting and duplicate suppression.

Clause 67. The method of clause 60, wherein transmitting payload fragments over the non-terrestrial link comprises fragmenting the profile package into bundles and using a convergence layer optimized for challenged links, and resuming transmission from a last acknowledged bundle on subsequent passes.

Clause 68. The method of clause 60, wherein the gateway maintains security by encapsulating end-to-end TLS records within payload fragments or, in a trusted proxy configuration, terminating TLS at the gateway and applying bundle-level security on the satellite leg.

Clause 69. A system comprising one or more computer-readable storage mediums or devices comprising, configured to store, and/or storing program instructions; and one or more processors configured to execute the program instructions to cause the system to perform the computer-implemented method of any of clauses 1-68.

Clause 70. One or more computer-readable storage mediums or devices comprising, configured to store, and/or storing program instructions, the program instructions executable by one or more processors to cause the one or more processors to perform the computer-implemented method of any of clauses 1-68.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like, with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like, may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of managing a SIM profile on a legacy IoT device using a hybrid protocol gateway, the method comprising, by the hybrid protocol gateway:

receiving a remote provisioning command over an IP control interface from a remote provisioning module, the command specifying a target identifier associated with a secure chip of a device;

determining a device type and current state of the device;

mapping the command to a corresponding legacy command;

generating legacy code compatible with an eSIM card of the device;

generating an SMS message including the legacy code; and transmitting the SMS message to the device, wherein the device is configured to execute the legacy code to implement the remote provisioning command.

2. The method of claim 1, wherein the remote provisioning command complies with SGP.32 standard.

3. The method of claim 1, wherein the generated legacy code complies with SGP.02 standard.

4. The method of claim 1, wherein the legacy code comprises one or more application protocol data unit (APDU) commands.

5. The method of claim 1, further comprising:

encrypting the legacy code prior to generating the SMS message.

6. The method of claim 1, wherein said transmitting is over a cellular network.

7. The method of claim 1, wherein the IP control interface comprises ESipa carried over HTTP or CoAP.

8. The method of claim 1, wherein the device type and the current state are determined based on an internal state database.

9. The method of claim 1, wherein the command comprises a device-centric disable-profile operation and the legacy code comprises an ES5 disable-profile operation.

10. The method of claim 1, wherein the command comprises a device-centric enable-profile operation and the legacy code implements an ES5 enable-profile operation.

11. The method of claim 1, wherein the command comprises a device-centric delete-profile operation and the legacy code implements an ES5 delete-profile operation.

12. The method of claim 1, wherein the command comprises a device-centric trigger-profile-download operation and the legacy code implements an ES5 download-profile operation including INSTALL/LOAD and STORE DATA messages.

13. The method of claim 1, wherein the command comprises a device-centric query-profile-state operation and the legacy code implements an ES5 profile-information operation including SELECT and GET STATUS messages directed to a profile security domain.

14. The method of claim 1, wherein the command comprises a device-centric list-profiles operation and the legacy code implements an ES5 enumeration operation to identify available profile security domains on the secure chip.

15. The method of claim 1, wherein the command comprises a device-centric set-active-profile operation and the legacy code implements an ES5 operation that enables a target profile security domain and disables a currently active profile according to a policy.

*    *    *    *    *